(12) United States Patent
Gupta et al.

(10) Patent No.: US 12,587,517 B2
(45) Date of Patent: Mar. 24, 2026

(54) PROOF-OF-WORK CHALLENGE TO TRANSMIT DATA TO A NON-AUTHENTICATED GATEWAY

(71) Applicant: Oracle International Corporation, Redwood Shores, CA (US)

(72) Inventors: Ankush Gupta, Seattle, WA (US); Gaurava Srivastava, Pleasanton, CA (US); Christian Rudolf Hoermann, Raleigh, NC (US)

(73) Assignee: Oracle International Corporation, Redwood Shores (CA)

( * ) Notice: Subject to any disclaimer, the term of this patent is extended or adjusted under 35 U.S.C. 154(b) by 40 days.

(21) Appl. No.: 18/664,141

(22) Filed: May 14, 2024

(65) Prior Publication Data

US 2025/0358269 A1     Nov. 20, 2025

(51) Int. Cl.
*H04L 9/40* (2022.01)

(52) U.S. Cl.
CPC ............. *H04L 63/08* (2013.01); *H04L 63/029* (2013.01); *H04L 63/0428* (2013.01)

(58) Field of Classification Search
CPC ... H04L 63/08; H04L 63/029; H04L 63/0428; H04L 63/10; H04L 9/3271; G06F 2221/2103
See application file for complete search history.

(56) References Cited

U.S. PATENT DOCUMENTS

| | | | |
|---|---|---|---|
| 6,567,916 B1 * | 5/2003 | Terao .................... | H04L 9/3213 713/168 |
| 8,412,952 B1 * | 4/2013 | Ramzan .................. | H04L 63/20 713/189 |
| 8,613,089 B1 * | 12/2013 | Holloway ........... | H04L 63/1458 709/227 |
| 9,202,038 B1 * | 12/2015 | Allen ...................... | G06F 21/40 |
| 9,305,151 B1 * | 4/2016 | Dotan .................... | G06F 21/31 |
| 9,348,981 B1 * | 5/2016 | Hearn ................... | H04L 9/3271 |
| 9,419,968 B1 * | 8/2016 | Pei .......................... | G06F 21/31 |
| 9,495,668 B1 * | 11/2016 | Juels ......................... | H04L 9/50 |
| 9,665,701 B2 * | 5/2017 | Kruger .................. | H04L 9/3271 |

(Continued)

OTHER PUBLICATIONS

International Search Report and Written Opinion for PCT Patent Application No. PCT/US2025/019837, dated Jun. 4, 2025.

*Primary Examiner* — Aravind K Moorthy
(74) *Attorney, Agent, or Firm* — Mughal Gaudry & Franklin PC

(57) ABSTRACT

A method for implementing a proof-of-work challenge for transmission of data to a non-authenticated gateway is disclosed. The method includes receiving, by the gateway and from a device, a challenge request; and transmitting a proof-of-work challenge to the device. The method further includes receiving, from the device, a solution to the challenge, wherein the solution to the challenge accompanies data. The method further includes verifying a validity of the solution to the challenge; and storing and/or processing the data, responsive at least in part to the solution being valid for the challenge. In an example, the solution to the challenge is to be derived by the device, without an intervention by a user of the device. In an example, the challenge request and the solution to the challenge are received from a library that is packaged with a mobile application being executed within the device.

24 Claims, 8 Drawing Sheets

(56) References Cited

U.S. PATENT DOCUMENTS

| | | | |
|---|---|---|---|
| 9,736,147 B1 * | 8/2017 | Mead | G06F 21/31 |
| 9,741,186 B1 * | 8/2017 | Lemke | H04W 12/069 |
| 9,906,552 B1 * | 2/2018 | Brown | H04L 63/1458 |
| 9,992,025 B2 * | 6/2018 | Mahaffey | G06F 8/70 |
| 10,122,737 B1 * | 11/2018 | McCorkendale | H04L 63/1416 |
| 10,298,396 B1 * | 5/2019 | Kurani | H04L 9/3226 |
| 10,313,117 B1 * | 6/2019 | Carlough | H04L 9/088 |
| 10,318,747 B1 * | 6/2019 | MacCárthaigh | H04L 63/0428 |
| 10,452,828 B1 * | 10/2019 | Larimer | G06F 21/32 |
| 10,467,327 B1 * | 11/2019 | Arazi | G06Q 30/02 |
| 10,469,605 B1 * | 11/2019 | Batey | G06F 21/64 |
| 10,855,475 B1 * | 12/2020 | Leach | H04L 9/0637 |
| 10,887,107 B1 * | 1/2021 | Chan | H04L 9/3271 |
| 10,965,474 B1 * | 3/2021 | Benson | H04L 9/3271 |
| 11,140,171 B1 * | 10/2021 | Friedman | H04L 9/0861 |
| 11,296,882 B1 * | 4/2022 | Singh | H04L 9/50 |
| 11,374,915 B1 * | 6/2022 | Munsell | H04L 63/10 |
| 11,405,189 B1 * | 8/2022 | Bennison | H04L 9/0656 |
| 11,520,776 B1 * | 12/2022 | Jacobson | H04L 9/0637 |
| 11,855,987 B1 * | 12/2023 | Chhabra | H04L 63/12 |
| 11,861,697 B1 * | 1/2024 | De'Angeli | H04L 63/0823 |
| 11,902,339 B1 * | 2/2024 | Param | H04L 9/3271 |
| 12,278,895 B1 * | 4/2025 | Stapleton | H04L 63/083 |
| 12,289,305 B1 * | 4/2025 | Best | H04L 63/08 |
| 12,293,179 B1 * | 5/2025 | Anantheswaran | G06F 8/60 |
| 12,506,611 B2 * | 12/2025 | Jakobsson | H04L 9/3213 |
| 2007/0011453 A1 * | 1/2007 | Tarkkala | H04L 9/3247 713/168 |
| 2008/0261191 A1 * | 10/2008 | Woolf | G09B 7/00 434/323 |
| 2009/0076965 A1 * | 3/2009 | Elson | H04L 63/1491 705/55 |
| 2010/0031315 A1 * | 2/2010 | Feng | H04L 63/1458 709/229 |
| 2010/0082998 A1 * | 4/2010 | Kohavi | G06F 21/36 713/182 |
| 2011/0113147 A1 * | 5/2011 | Poluri | G06F 21/36 709/229 |
| 2012/0090028 A1 * | 4/2012 | Lapsley | H04L 63/1416 704/E21.001 |
| 2014/0059663 A1 * | 2/2014 | Rajshekar | G06F 16/40 726/6 |
| 2014/0068735 A1 * | 3/2014 | Marinov | G06F 21/31 726/7 |
| 2014/0123231 A1 * | 5/2014 | Low | H04L 63/0892 726/4 |
| 2015/0180857 A1 * | 6/2015 | Schulman | H04L 63/08 726/9 |
| 2015/0188891 A1 * | 7/2015 | Grange | H04L 63/0838 380/270 |
| 2015/0213449 A1 * | 7/2015 | Morrison | G06Q 20/4016 705/44 |
| 2015/0281362 A1 * | 10/2015 | Shanmugam | H04L 63/0892 709/217 |
| 2015/0365401 A1 * | 12/2015 | Brown | G06F 21/31 726/7 |
| 2015/0381376 A1 * | 12/2015 | Wardman | H04L 63/0861 726/25 |
| 2016/0080355 A1 * | 3/2016 | Greenspan | H04L 63/08 726/7 |
| 2016/0094551 A1 * | 3/2016 | Sugihara | H04L 9/14 726/7 |
| 2017/0076265 A1 * | 3/2017 | Royyuru | G06Q 20/18 |
| 2017/0185771 A1 * | 6/2017 | Sun | G06F 21/57 |
| 2017/0300912 A1 * | 10/2017 | Narasimhan | H04L 63/08 |
| 2017/0366348 A1 * | 12/2017 | Weimer | H04L 9/3247 |
| 2018/0069847 A1 * | 3/2018 | Potnuru | H04L 63/0853 |
| 2018/0089465 A1 * | 3/2018 | Winstrom | H04L 9/3247 |
| 2018/0097818 A1 * | 4/2018 | Shekh-Yusef | H04L 9/3265 |
| 2018/0139042 A1 * | 5/2018 | Binning | G06F 21/6218 |
| 2018/0183601 A1 * | 6/2018 | Campagna | G06F 21/602 |
| 2018/0183839 A1 * | 6/2018 | Chiang | H04L 65/1069 |
| 2018/0204213 A1 * | 7/2018 | Zappier | H04L 63/08 |
| 2018/0212833 A1 * | 7/2018 | Bharti | H04L 9/00 |
| 2018/0212970 A1 * | 7/2018 | Chen | H04L 9/3236 |
| 2018/0247063 A1 * | 8/2018 | Li | H04L 63/062 |
| 2018/0300572 A1 * | 10/2018 | Esman | G06V 40/20 |
| 2019/0036896 A1 * | 1/2019 | Khushu | H04L 63/08 |
| 2019/0058580 A1 * | 2/2019 | Tormasov | H04L 9/3239 |
| 2019/0182029 A1 * | 6/2019 | Yim | H04L 9/3239 |
| 2019/0208418 A1 * | 7/2019 | Breu | H04L 9/3231 |
| 2019/0280863 A1 * | 9/2019 | Meyer | H04L 9/50 |
| 2019/0305934 A1 * | 10/2019 | Cantrell | G06Q 20/202 |
| 2019/0305968 A1 * | 10/2019 | Versteeg | H04L 9/3271 |
| 2019/0324995 A1 * | 10/2019 | Jakobsson | H04L 9/50 |
| 2019/0332763 A1 * | 10/2019 | Berler | H04L 9/3271 |
| 2019/0334912 A1 * | 10/2019 | Sloane | G06F 21/604 |
| 2019/0334954 A1 * | 10/2019 | Manamohan | H04L 67/10 |
| 2019/0372781 A1 * | 12/2019 | Ra | H04L 9/3239 |
| 2019/0394113 A1 * | 12/2019 | Huang | H04L 43/04 |
| 2020/0007513 A1 * | 1/2020 | Gleichauf | G06F 21/105 |
| 2020/0067862 A1 | 2/2020 | Giralte | |
| 2020/0084020 A1 * | 3/2020 | Fazzone | H04L 63/0876 |
| 2020/0092088 A1 * | 3/2020 | Novotny | G06F 21/64 |
| 2020/0119922 A1 * | 4/2020 | Bingham | H04L 9/0637 |
| 2020/0162264 A1 * | 5/2020 | Zamani | H04L 9/3297 |
| 2020/0175156 A1 * | 6/2020 | Bhamidipati | G06Q 20/3678 |
| 2020/0177569 A1 * | 6/2020 | Kleeberger | H04L 63/1458 |
| 2020/0195421 A1 * | 6/2020 | Gagnon | H04L 9/0637 |
| 2020/0201981 A1 * | 6/2020 | Wardman | G06F 21/44 |
| 2020/0257815 A1 * | 8/2020 | Huang | H04L 63/0428 |
| 2020/0259643 A1 * | 8/2020 | Pazhoor | H04L 67/52 |
| 2020/0313859 A1 * | 10/2020 | Ateniese | H04L 9/3271 |
| 2020/0351237 A1 * | 11/2020 | Chakkirala | G06Q 50/01 |
| 2020/0374270 A1 * | 11/2020 | Mishra | H04L 9/3297 |
| 2020/0396209 A1 * | 12/2020 | Roy | H04L 9/0841 |
| 2021/0004225 A1 * | 1/2021 | Karunakaran | G06F 8/71 |
| 2021/0067539 A1 * | 3/2021 | Soryal | H04L 63/1416 |
| 2021/0091960 A1 * | 3/2021 | Werner | H04L 9/0897 |
| 2021/0126769 A1 * | 4/2021 | Soundararajan | H04L 63/10 |
| 2021/0126796 A1 * | 4/2021 | Soundararajan | H04L 9/0637 |
| 2021/0133304 A1 * | 5/2021 | Larson | H04L 63/08 |
| 2021/0144002 A1 * | 5/2021 | Aronesty | H04L 9/14 |
| 2021/0160277 A1 * | 5/2021 | Hebert | H04L 63/1466 |
| 2021/0200178 A1 * | 7/2021 | Mishra | H04L 9/50 |
| 2021/0234695 A1 * | 7/2021 | Soroker | H04L 9/3213 |
| 2021/0240804 A1 * | 8/2021 | Kubota | B60R 25/246 |
| 2021/0243205 A1 * | 8/2021 | Peron | H04L 63/1408 |
| 2021/0279293 A1 * | 9/2021 | Jakobsson | H04L 9/3239 |
| 2021/0297422 A1 * | 9/2021 | McDorman | H04L 63/107 |
| 2021/0304017 A1 * | 9/2021 | Stahlhut | G06Q 20/405 |
| 2021/0314140 A1 * | 10/2021 | Stephenson | H04L 9/3066 |
| 2021/0314293 A1 * | 10/2021 | Soundararajan | H04L 63/10 |
| 2021/0326992 A1 * | 10/2021 | Leise | G06N 20/00 |
| 2021/0329006 A1 * | 10/2021 | Kam | H04L 63/123 |
| 2021/0337009 A1 * | 10/2021 | Spång | H04L 67/564 |
| 2021/0342894 A1 * | 11/2021 | Pestana | H04L 9/3218 |
| 2021/0344766 A1 * | 11/2021 | Monahov | H04L 9/0618 |
| 2022/0067140 A1 * | 3/2022 | Cambou | G06F 21/45 |
| 2022/0094639 A1 * | 3/2022 | Mutschler | H04L 43/0888 |
| 2022/0107958 A1 * | 4/2022 | Panda | H04L 9/0643 |
| 2022/0131857 A1 * | 4/2022 | Nolte | H04L 63/0823 |
| 2022/0210117 A1 * | 6/2022 | Tan | H04W 48/14 |
| 2022/0253788 A1 * | 8/2022 | Hingne | H04L 67/10 |
| 2022/0261473 A1 * | 8/2022 | Zhai | G06F 21/42 |
| 2022/0300962 A1 * | 9/2022 | Zia | G06Q 20/38215 |
| 2022/0342951 A1 * | 10/2022 | Doiron | H04L 9/50 |
| 2022/0342958 A1 * | 10/2022 | Lillard | G06F 16/51 |
| 2022/0343028 A1 * | 10/2022 | Krishnan | G06F 21/44 |
| 2022/0385549 A1 * | 12/2022 | Pavlovic | H04L 9/50 |
| 2023/0100394 A1 * | 3/2023 | Atkin | H04L 63/101 726/21 |
| 2023/0198770 A1 * | 6/2023 | Agrawal | G06F 16/2246 726/22 |
| 2023/0224413 A1 * | 7/2023 | Masato | H04N 1/00344 358/1.14 |
| 2023/0229767 A1 * | 7/2023 | Galli | G06F 21/36 726/23 |
| 2023/0239157 A1 * | 7/2023 | Zamani | H04L 9/3297 713/168 |
| 2023/0283487 A1 * | 9/2023 | Angelo | H04L 9/3278 713/168 |

(56)     References Cited

U.S. PATENT DOCUMENTS

| | | | | |
|---|---|---|---|---|
| 2023/0318837 A1* | 10/2023 | Oh | H04L 9/3218 | 713/168 |
| 2023/0327890 A1* | 10/2023 | Agrawal | H04L 9/50 | 713/168 |
| 2023/0370275 A1* | 11/2023 | Aspler-Yaskil | H04L 9/50 | |
| 2023/0370449 A1* | 11/2023 | Hayes, Jr. | G06N 20/00 | |
| 2023/0421540 A1* | 12/2023 | Ocegueda | G06F 9/547 | |
| 2024/0045942 A1* | 2/2024 | Lal | G06F 3/04815 | |
| 2024/0070795 A1* | 2/2024 | Pierce | H04L 67/53 | |
| 2024/0144246 A1* | 5/2024 | Steeves | G06Q 20/145 | |
| 2024/0146543 A1* | 5/2024 | Sahoo | H04L 9/0894 | |
| 2024/0281273 A1* | 8/2024 | Jha | G06F 16/287 | |
| 2024/0281796 A1* | 8/2024 | Finlow-Bates | G06Q 20/405 | |
| 2024/0303638 A1* | 9/2024 | Osborn | G06Q 20/388 | |
| 2024/0364535 A1* | 10/2024 | Stockmann | H04L 9/3271 | |
| 2024/0386418 A1* | 11/2024 | Chen | G06Q 20/3674 | |
| 2024/0422215 A1* | 12/2024 | Khan | H04L 67/63 | |
| 2025/0005132 A1* | 1/2025 | Fu | G06F 21/45 | |
| 2025/0007730 A1* | 1/2025 | Vercalli | H04L 9/3297 | |
| 2025/0094556 A1* | 3/2025 | Sarvana | G06F 21/36 | |
| 2025/0117254 A1* | 4/2025 | Bhargava | G06F 9/5072 | |
| 2025/0131110 A1* | 4/2025 | Wang | G06F 21/604 | |
| 2025/0202719 A1* | 6/2025 | Gaddam | H04L 9/3271 | |
| 2025/0226985 A1* | 7/2025 | Lind | H04L 9/3228 | |
| 2025/0227109 A1* | 7/2025 | Friedman | H04L 63/0876 | |
| 2025/0238497 A1* | 7/2025 | Ramamurthy | G06F 21/36 | |
| 2025/0343675 A1* | 11/2025 | Witoff | H04L 9/302 | |

* cited by examiner

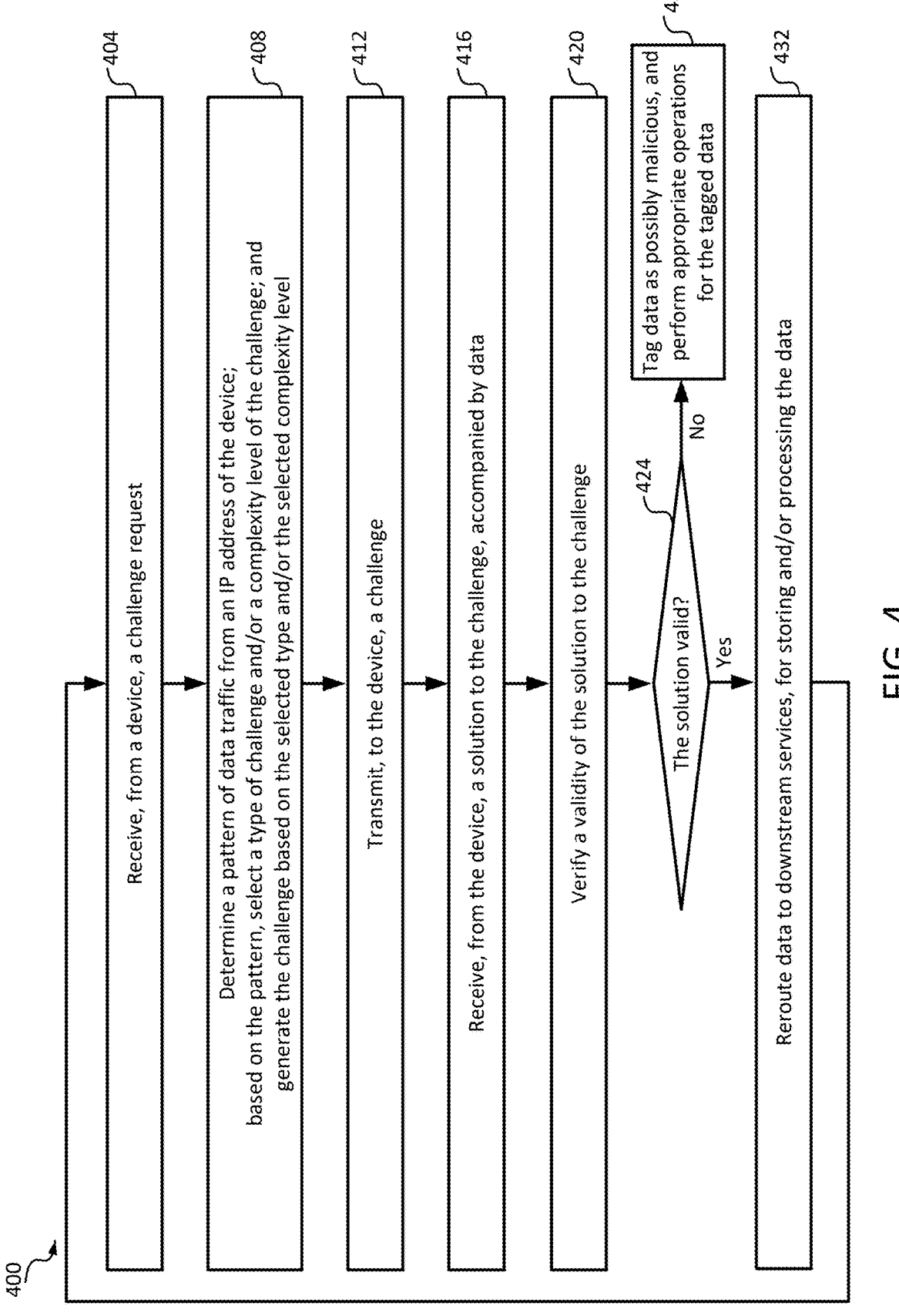

404 Receive, from a device, a challenge request

408 Determine a pattern of data traffic from an IP address of the device; based on the pattern, select a type of challenge and/or a complexity level of the challenge; and generate the challenge based on the selected type and/or the selected complexity level 412 Transmit, to the device, a challenge 416 Receive, from the device, a solution to the challenge, accompanied by data 420 Verify a validity of the solution to the challenge 424 The solution valid?

No

428 Tag data as possibly malicious, and perform appropriate operations for the tagged data Yes 432 Reroute data to downstream services, for storing and/or processing the data

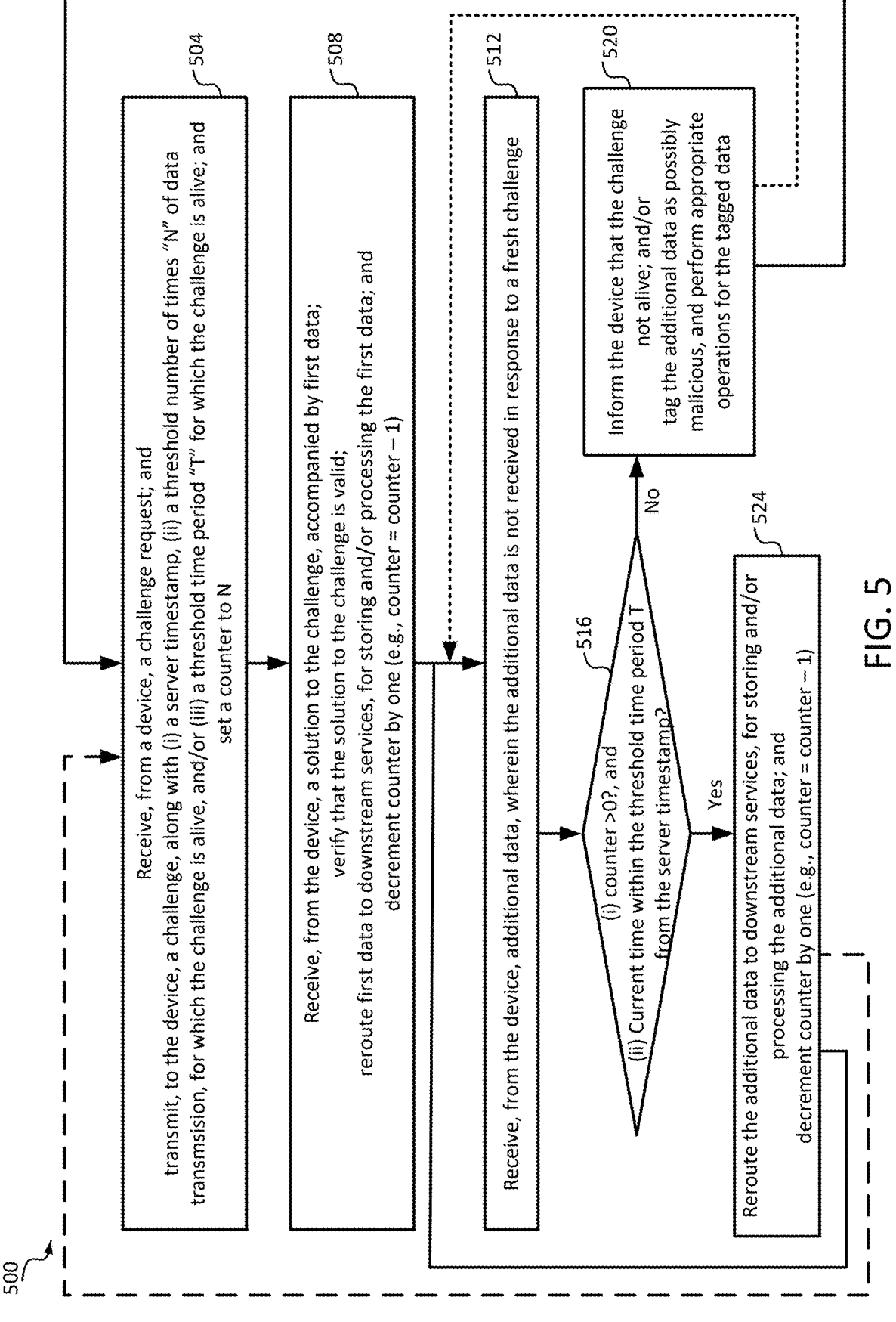

FIG. 5

Receive, from a device, a challenge request; and
transmit, to the device, a challenge, along with (i) a server timestamp, (ii) a threshold number of times "N" of data transmsision, for which the challenge is alive, and/or (iii) a threshold time period "T" for which the challenge is alive; and set a counter to N

504

Receive, from the device, a solution to the challenge, accompanied by first data;
verify that the solution to the challenge is valid;
reroute first data to downstream services, for storing and/or processing the first data; and decrement counter by one (e.g., counter = counter – 1)

508

Receive, from the device, additional data, wherein the additional data is not received in response to a fresh challenge

512

(i) counter >0?, and
(ii) Current time within the threshold time period T from the server timestamp?

516

No

Yes

Inform the device that the challenge not alive; and/or
tag the additional data as possibly malicious, and perform appropriate operations for the tagged data

520

Reroute the additional data to downstream services, for storing and/or processing the additional data; and decrement counter by one (e.g., counter = counter – 1)

524

500

PROOF-OF-WORK CHALLENGE TO TRANSMIT DATA TO A NON-AUTHENTICATED GATEWAY

BACKGROUND

A cloud provider provides on-demand, scalable computing resources (e.g., a cloud environment) to its cloud customers. A cloud environment may include one or more customizable virtual networks, which may also be referred to as virtual cloud networks, virtual private networks, or virtual private cloud. A virtual network is a software-defined network that creates a logically isolated network on top of a physical network. A gateway serves as a connection point that allows data to flow between networks. A gateway for a virtual network may be a software-defined router. Various types of gateways may be used. An Internet gateway connects a virtual network to the Internet. A dynamic routing gateway (DRG), also referred to as a virtual private network gateway, creates a secure tunnel connection between a virtual network and another network, such as a local on-premise network or another virtual network in the cloud environment. A client wanting to transmit data to a resource within a virtual network transmits the data through a gateway of the virtual network.

A cloud environment may further include one or more partitions or containers that provide isolation between cloud resources. Such an isolated partition may also be referred to as a tenancy, project, or account. Resources in different tenancies are isolated from each other unless explicitly shared. A single tenancy may include one or more virtual networks. As used herein, "access to a tenancy" may refer to access to a virtual network within a tenancy.

BRIEF SUMMARY

In some embodiments, a computer-implemented method includes receiving, from a device, a challenge request; transmitting, to the device, a challenge, responsive at least in part to the challenge request, wherein the challenge is a proof-of-work challenge; receiving, from the device, a solution to the challenge, wherein the solution to the challenge accompanies data; verifying a validity of the solution to the challenge; and performing one or both of storing and processing the data, responsive at least in part to the solution being valid for the challenge.

In an example, the solution to the challenge is derived by the device. In an example, the challenge is set such that the solution to the challenge is to be derived by the device, without any intervention by a user of the device and without the user of the device providing the solution. In an example, a derivation of the solution to the challenge is transparent to a user of the device. In an example, the challenge request and the solution to the challenge are received from a library that is packaged with a mobile application being executed within the device; and the data is generated based on the library monitoring an operation of the mobile application. In an example, the solution accompanying the data is received by a gateway; and performing one or both of storing and processing the data is not dependent on authentication or identification of the device by the gateway.

In an example, the challenge request is a first challenge request, the device is a first device, the challenge is a first challenge, the solution is a first solution, and the method further comprises: receiving, from a second device, a second challenge request; transmitting, to the second device, a second challenge, responsive at least in part to the second challenge request; receiving, from the second device, a second solution to the second challenge, wherein the second solution to the second challenge accompanies additional data; verifying that the second solution to the second challenge is invalid; and refraining from storing or processing the additional data, responsive at least in part to verifying that the second solution to the second challenge is invalid. In an example, the method further comprises: responsive at least in part to verifying that the second solution to the second challenge is invalid, performing at least one of: (i) determining an Internet Protocol (IP) address of the second device, and blocking additional challenge requests from the IP address from at least a threshold period of time; or (ii) transmitting, to the second device, a third challenge, wherein the third challenge is more complex than the second challenge and is expected to require more computation cycles to solve than solving the second challenge.

In an example, the device is a first device, and the method further comprises: receiving, from a second device, additional data that is not accompanied by any solution or that is not in response to a transmission of any challenge to the second device; and refraining from storing or processing the additional data, responsive at least in part to the additional data not being accompanied by any solution or not being in response to the transmission of any challenge to the second device.

In an example, the method further comprises determining an Internet Protocol (IP) address of the device; selecting a level of complexity for the challenge, based at least in part on an observed pattern of prior data transmission received from the IP address; and generating the challenge with the selected level of complexity, wherein the generated challenge is transmitted to the device. In an example, selecting the level of complexity for the challenge comprises: prior to receiving the challenge request, receiving higher than a threshold number of additional challenge requests from the IP address of the device within a threshold time duration; and selecting a higher level of complexity for the challenge that is higher than a lower level of complexity, responsive at least in part to receiving higher than the threshold number of additional challenge requests within the threshold time duration, wherein a number of computation cycles to solve the challenge with the higher level of complexity is expected to be higher than a number of computation cycles to solve the challenge with the lower level of complexity. In an example, the challenge involves a requested leading number of zeros, wherein the solution comprises a header, which when processed using a pre-agreed algorithm, results in the requested leading number of zeros; and selecting the level of complexity for the challenge comprises increasing the requested leading number of zeros to correspondingly increase the level of complexity for the challenge.

In an example, the challenge request is a first challenge request, the challenge is a first challenge, and the method further comprises: subsequent to receiving the solution to the challenge, receiving, from the device, a second challenge request, wherein the second challenge request is received within a threshold time duration from receiving the first challenge request; generating a second challenge, wherein a level of complexity of the second challenge is higher than a level of complexity of the first challenge, responsive at least in part to receiving the second challenge request within the threshold time duration from receiving the first challenge request; and transmitting, to the device, the second challenge.

In an example, the method further comprises: generating a first token by hashing an Internet Protocol (IP) address of the device with a seed; generating the challenge that includes a requested number of leading zeros, wherein the generated challenge is transmitted to the device and is accompanied by one or more of (i) a first identifier of the challenge, (ii) the first token, and (iii) a timestamp associated with generating the challenge; and reading the solution to the challenge, wherein the solution includes a header, and wherein reading the solution comprises identifying, within the header, (i) a second identifier of the challenge, (ii) a second token, and (iii) a string of numbers generated by the device. In an example, verifying the validity of the solution to the challenge comprises: verifying that the second token is a hash of the IP address of the device and the seed; verifying that the second identifier of the challenge matches the first identifier of the challenge; and encrypting the header using a pre-agreed algorithm to generate an encrypted header, and verifying that the encrypted header has the requested number of leading zeros.

In an example, the method further comprises generating a timestamp indicative of a time of generation of the challenge or transmission of the challenge to the device; wherein verifying the validity of the solution to the challenge comprises: verifying whether (i) the solution is correct for the challenge, and (ii) the solution is received with a threshold time duration from the timestamp. In an example, the method further comprises transmitting a response to the device, subsequent to storing or processing the data, wherein the response indicates one or more of (i) the solution is valid, and (ii) data is stored, and will be or has been processed.

In an example, the data is first data, the solution to the challenge is valid for transmitting data for a threshold number of times, and the method further comprises: subsequent to verifying the validity of the solution to the challenge, setting a counter indicative of the threshold number of times; decrementing the counter by one, responsive at least in part to storing or processing the data; receiving, from the device, second data; subsequent to receiving the second data, verifying that the counter is greater than zero; at least one of storing or processing the second data, responsive at least in part to verifying that the counter is greater than zero; and subsequent to the at least one of storing or processing the second data, decrementing the counter by one. In an example, the solution to the challenge is valid for transmitting data for a threshold period of time, and the method comprises: subsequent to receiving the second data, verifying that a current time is within the threshold period of time from a timestamp associated with the challenge, wherein the at least one of storing or processing the second data is further responsive at least in part to verifying that the current time is within the threshold period of time from the timestamp.

In some embodiments, another computer-implemented method includes transmitting, from a client to a gateway, a challenge request; receiving a proof-of-work challenge, responsive at least in part to the challenge request; solving the challenge to generate a solution; identifying data to be sent to a server through the gateway; and transmitting the solution, along with the data, to the server through gateway. In an example, the server is within a cloud provider tenancy of a cloud environment, and wherein the client is a mobile application that is configured to transmit application data of a mobile application to a customer tenancy of the cloud environment, the customer tenancy being different from the cloud provider tenancy.

In some embodiments, a non-transitory computer-readable medium including instructions that when executed by one or more processors, cause the one or more processors to perform operations including: receiving, from a device, a challenge request; transmitting, to the device, a challenge, responsive at least in part to the challenge request, wherein the challenge is a proof-of-work challenge; receiving, from the device, a solution to the challenge, wherein the solution to the challenge accompanies data; verifying a validity of the solution to the challenge; and at least one of storing or processing the data, responsive at least in part to the solution being valid for the challenge.

In some embodiments, a system includes one or more processors; and one or more non-transitory computer-readable media storing instructions, which, when executed by the system, cause the system to perform a set of actions including: receiving, from a device, a challenge request; transmitting, to the device, a challenge, responsive at least in part to the challenge request, wherein the challenge is a proof-of-work challenge; receiving, from the device, a solution to the challenge, wherein the solution to the challenge accompanies data; verifying a validity of the solution to the challenge; and performing one or both of storing and processing the data, responsive at least in part to the solution being valid for the challenge.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 4 is a flow diagram depicting a method for challenge/solution communication between a gateway of a cloud network and a device, for transmission of data from the device to the gateway, where the challenge/solution communication involves the gateway posing a proof-of-work challenge to the device.

FIG. 5 is another flow diagram depicting another method for challenge/solution communication between a gateway of a cloud network and a device, for transmission of data from the device to the gateway, where the challenge/solution communication involves the gateway posing a proof-of-work challenge to the device, and where the same challenge can be used for a number of times "N" and/or for a time period "T," where N is a positive integer that is at least one, and T is a time duration that is greater than zero.

Figure 6:
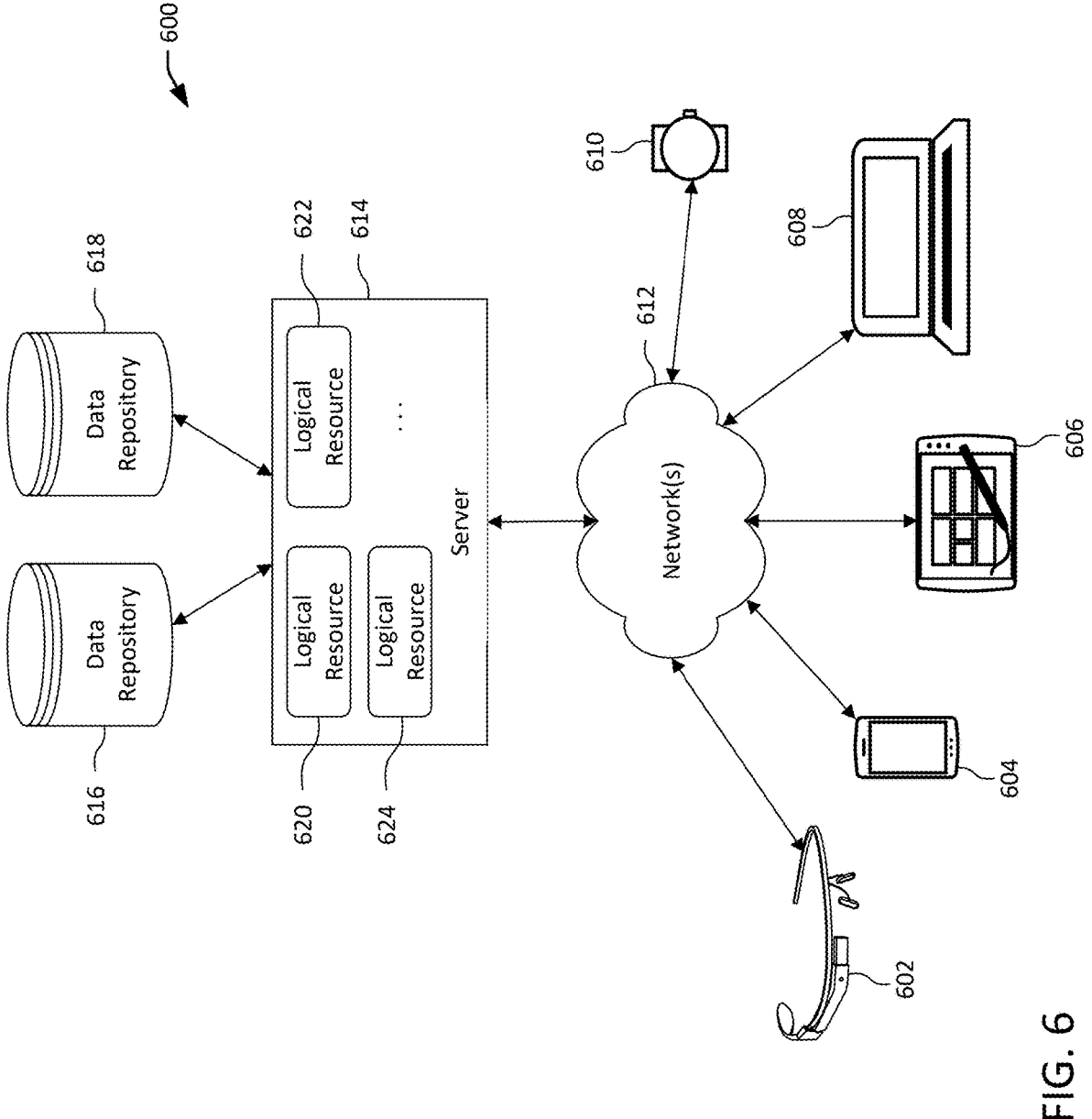

FIG. 6 depicts a simplified diagram of a distributed system for implementing certain aspects.

Figure 7:
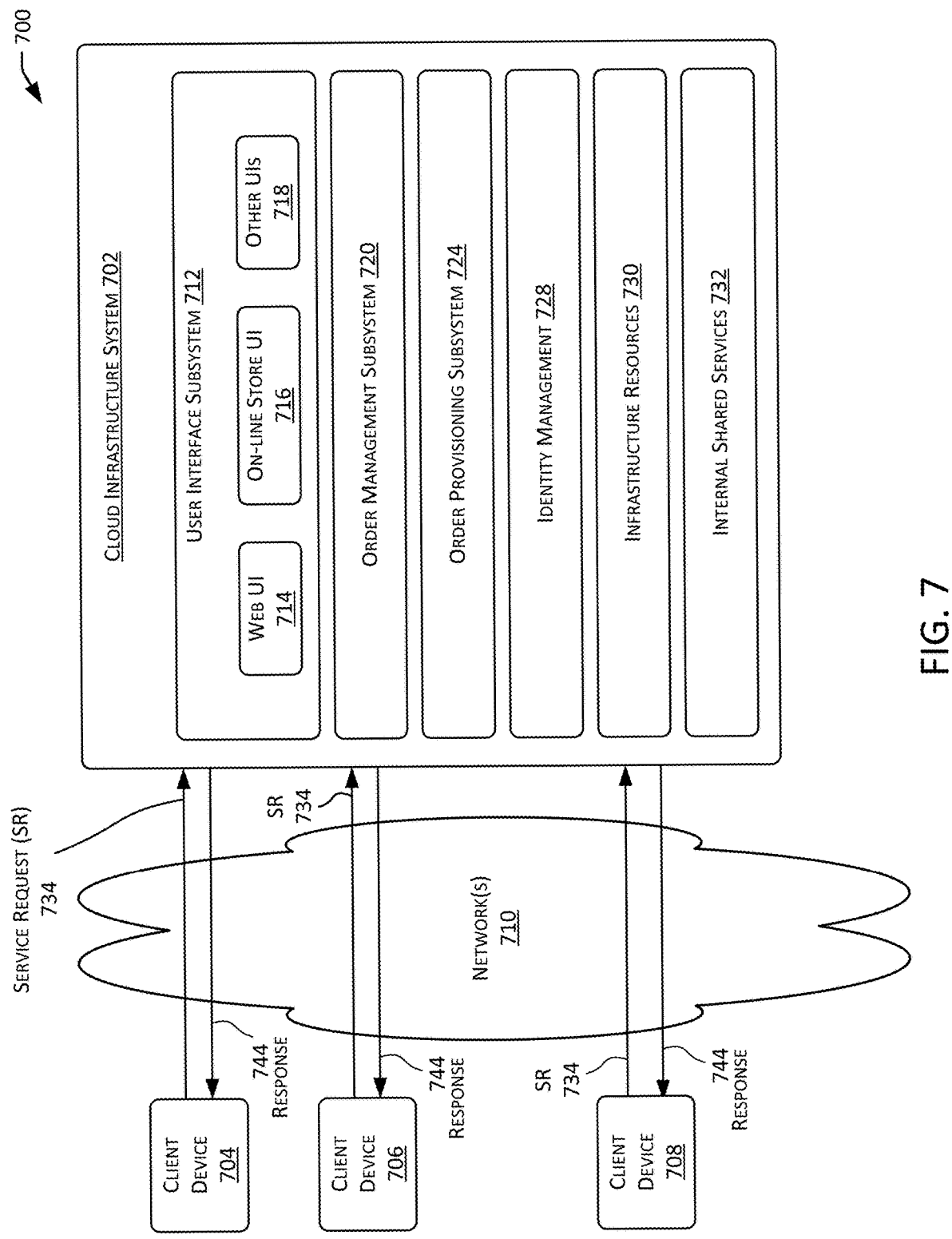

FIG. 7 is a simplified block diagram of one or more components of a system environment by which services provided by one or more components of an embodiment system may be offered as cloud services, in accordance with certain aspects.

Figure 8:
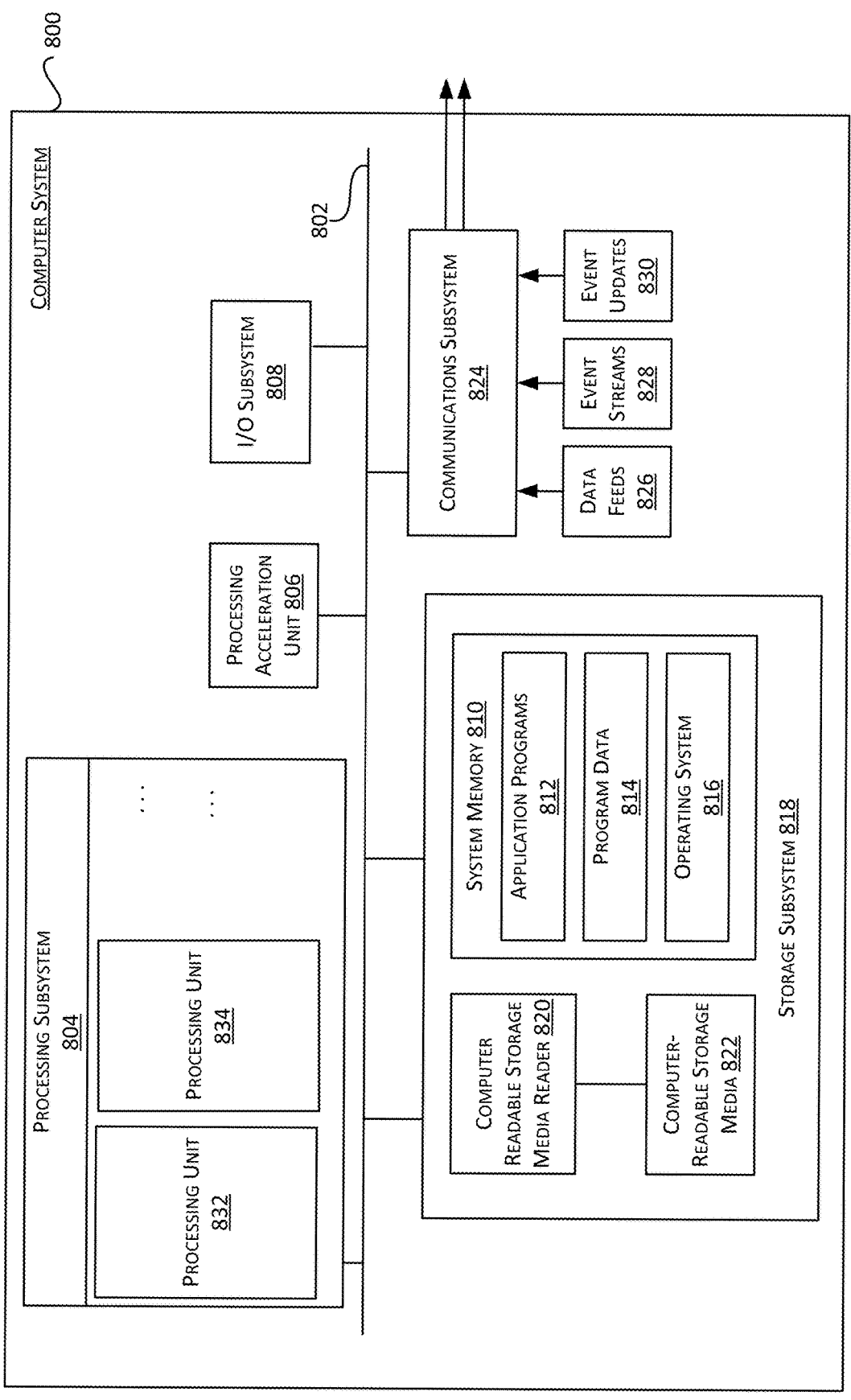

FIG. 8 illustrates an example computer system that may be used to implement certain aspects.

DETAILED DESCRIPTION

As described above, in an example, a gateway provides access to a cloud network, such as a virtual network within a cloud environment. For example, a client wanting to transmit data to the virtual network transmits the data through a gateway of the virtual network. In some situations, the gateway may be a non-authenticated gateway. For the purposes of this disclosure, a gateway being "non-authenticated" implies that the gateway accepts data from any device, without performing any authentication, authorization, and/or identification of the device sending data to the gateway. The gateway does not perform authentication to determine whether a client's identity is the claimed identity or perform authorization to determine whether a client has permissions to perform the desired access to a resource behind the gateway or otherwise determine whether a client transmitting data to the gateway has legitimate purpose to transmit legitimate data through the gateway. Due to the lack of such verification, there is a possibility that the client is a malicious actor transmitting possibly malicious data to the gateway. The non-authenticated gateway is to forward the data received from the client to one or more downstream services within the virtual network. The downstream services may further process the data. Examples of legitimate client devices and malicious client devices have been described below.

In an example, malicious devices may transmit a large volume of data to the gateway. Because the gateway does not know if the received data are from legitimate or malicious devices, the gateway may transmit such received data to the downstream services for logging and/or processing. Receipt, logging, and/or processing of a large volume of such malicious data may lead to consumption of substantial computing resources of the tenancy. This may result in a possibility of a Distributed Denial of Service (DDoS) attack on the tenancy. Note that the malicious data need not include any virus or malware, or need not be a security threat to the tenancy. Rather, processing of such data may unnecessarily consume substantial computational resources of the tenancy, thereby leading to the possibility of the DDoS attack. In an example, in addition to or instead of launching a DDoS attack, malicious devices may transmit malicious or fake data to the gateway. Processing of such fake data may result in the downstream processing service being confused, and possibly taking undue actions based on such fake and false data.

In some embodiments, to prevent or at least reduce chances of such DDoS attack and/or to prevent or at least reduce chances of processing such fake data and take undue actions based on such fake data, the routing of data from the gateway to the downstream services (such as logging and processing services) is conditioned on solving a challenge by the client transmitting the data to the gateway. The data to be routed can be sent to the gateway, along with a solution to a live challenge. A challenge can be configured to stay alive only for a threshold number of data transmissions and/or for a threshold period of time, as described below in further detail. For example, when the client initially requests to transmit the data to the gateway (or transmits a challenge request to the gateway), the gateway transmits a challenge to the client. The client solves the challenge, which consumes some computational resources of the client. The client then transmits a solution to the challenge, along with the data, to the gateway. For the purposes of this disclosure, (i) transmission of the challenge from the gateway to the client, and (ii) transmission of a solution thereof from the client to the gateway, in combination, are referred to as a challenge/solution communication. Upon receiving the solution from the client and verifying that the solution is a valid solution to the challenge, the gateway reroutes the data to the downstream services, for subsequent processing and/or analyzing of the data.

If the solution is not valid, the gateway may discard the data, or may tag the data as being potentially malicious and then process the tagged possibly malicious data in a manner that is different from data that are not tagged as being malicious data. Handling of such tagged data, if the solution is not valid, may vary from one implementation to the next.

In an example, the gateway may monitor a pattern of the data received at the gateway. In an example, the gateway does not identify or authenticate the client and is hence unable to directly track data traffic from a specific client. However, the gateway may identify a source IP address of the received data traffic, and hence be able to track a pattern of data traffic originating from the same IP address. Unless otherwise stated, in this disclosure, a reference to tracking or monitoring communications with a client (such as monitoring data transmission pattern from the client) implies that the gateway is tracking or monitoring communications that share a common source attribute, and the common source attribute is associated with the client. A source IP address is an example of a common source attribute. For example, the gateway may monitor data transmission patterns from the same IP address, thereby identifying data transmission from one or more client device having the IP address.

If incoming data traffic sharing a common source attribute (for example, the same source IP address) to the gateway becomes increasingly suspicious, the gateway adaptively increases a level of difficulty of the challenges that it prompts the clients associated with the common source attribute to solve, thereby also increasing computational effort and time required by the clients to solve the increasingly difficult challenges. This increase in the computational effort and time required by a client to solve the increasingly difficult challenges results in a slow-down of a rate at which the client can transmit data through the gateway. That is, because the computation resources of the client are used to solve the challenge, it may be difficult for the client to transmit large volume of data to the gateway (e.g., increasingly complex problems consuming increasingly higher computing resource have to be solved prior to sending large volume of data to the gateway). This results in avoidance or at least reduction of possible DDoS attacks, and/or avoidance or at least reduction of possibilities of processing fake data and/or taking undue actions based on such fake data.

In some embodiments, various techniques disclosed herein pertain to protecting non-authenticated gateways, where a non-authenticated gateway accepts data from a device, without performing any authentication, identification, and/or authorization of the device sending data to the gateway. Discussed below are examples of such non-authenticated gateways used in a mobile application scenario where a non-authenticated gateway is supposed to received telemetry data for software assurance purposes. However, the teachings of this disclosure may be applicable to other examples of non-authenticated gateways as well.

In an example, a cloud environment includes a cloud customer tenancy and a cloud provider tenancy. As described above, a tenancy is an isolated partition within the cloud environment, such that resources in different tenancies are isolated from each other unless explicitly shared. Each tenancy runs a plurality of virtual machine compute instances. The cloud customer tenancy is rented out or otherwise assigned to a cloud customer, and the cloud provider tenancy is used by the provider of the cloud environment to provide one or more services to one or more cloud customer tenancies.

In an example, the cloud customer deploys mobile applications (or mobile apps) to mobile computing devices (such as wireless computing devices, e.g., smartphones and tablets). The mobile applications communicate with a corresponding cloud application hosted by the cloud customer within the cloud customer tenancy. When an end user opens the mobile application in a mobile device, the mobile application communicates with the cloud application, to receive services from the cloud application. In an example, the mobile application is configured to exchange mobile application data with the cloud application hosted in the cloud customer tenancy, as described below in further detail.

In the context of software assurance of the mobile application, in an example, an assurance administrator may additionally be involved. The assurance administrator may or may not be the same as a cloud provider that owns the cloud environment. In an example, the assurance administrator may have a monitoring role or some degree of control over the working of the mobile application. Merely as an example, the cloud provider may want to ensure that the mobile application transmits relevant mobile application data (e.g., including user data) to the cloud customer tenancy, and does not communicate with or transmit data to any unauthorized third party. The cloud provider (or another authorized party) may want to ensure that the mobile application does not provide any service or functionality that have not been pre-authorized or pre-agreed between the mobile application provider and the cloud provider (e.g., including transmission of user data to an unauthorized party). Thus, the cloud provider acts as a software assurance administrator, e.g., acts in a monitoring role to ensure that the mobile application is working as intended.

To maintain such supervisory control and/or monitoring role over the mobile application, the cloud provider (or the provider of the mobile application) may package an assurance service with the mobile application. The assurance service may include a software library. In an example, the software library may be developed by the cloud provider. Due to the packaging, whenever a user of the mobile device downloads and installs the mobile application in the mobile device, the assurance service may also be downloaded and installed in the mobile device along with the mobile application. The assurance service and its operation may generally be transparent and undetectable to the end user of the mobile application. The assurance service monitors the behavior of the mobile application, generates telemetry data, and periodically transmits such telemetry data to a non-authenticated gateway of the cloud provider tenancy, e.g., for logging and subsequent analysis at the cloud provider tenancy. For example, such telemetry data may be analyzed at the cloud provider tenancy, to detect any suspicious, malicious, or anomalous activity or behavior of the mobile application, and potentially undertake corrective actions (or generate reports, based on which corrective actions may be undertaken), as described below in further detail.

For reasons described in detail herein below, the gateway of a virtual network (such as a gateway providing access to a cloud network, such as the cloud provider tenancy) may not perform any authentication, identification, and/or authorization of the device sending data to the gateway. Thus, the gateway of the cloud network of the cloud provider tenancy is a non-authenticated gateway. Hence, in an example, the gateway may not know if data received by the gateway is data from an assurance service of a mobile application, or if the received data is malicious data (such as fake data described above) from a device wanting to launch a DDoS attack on the cloud provider tenancy. In this example, the assurance service has legitimate reasons to transmit the telemetry data to the gateway, and hence, the telemetry data are examples of legitimate data, and the transmitting client device is a legitimate client device, although the non-authenticated gateway does not identify if the transmitting device is legitimate or malicious.

Accordingly, a proof-of-work challenge communication is used whenever a client wants to transmit data to the non-authenticated gateway. A proof-of-work challenge is a form of cryptographic proof in which one party (such as the client) proves to another party (such as the non-authenticated gateway) that a certain amount of computational effort has been expended to arrive at a solution to the challenge.

For example, whenever a client wants to transmit data to the non-authenticated gateway, the client transmits a challenge request and receives a challenge from the gateway. The client (which may be the assurance service of a mobile application, or a malicious device) solves the challenge, and transmits the challenge solution along with data to the gateway. The gateway receives the data from the client (e.g., which may be the assurance service of the mobile application, or may be a malicious device), and either (i) reroutes the received data to one or more downstream services data, if the data is accompanied by a valid solution to the challenge, (ii) or tags the received data as being possibly malicious and possibly discards such tagged data, if the data is accompanied by an invalid solution to the challenge or is not accompanied by any solution to a challenge, as will be described below in further detail.

In an example, a complexity of the challenge is selected adaptively (e.g., based on a pattern of data traffic being received from a particular IP address), which facilitates in deterring DDoS attacks and/or facilitates in deterring transmission of large volume of fake data in order to confuse downstream processing and analyzing services. For example, if a malicious client wants to transmit large volume of data as a part of DDoS attack (or in order to confuse downstream processing and analyzing services to take undue actions based on the fake data), the gateway adaptively increases the level of difficulty of the challenges that it prompts the client to solve, thereby also increasing computational effort and time required by the client to solve the increasingly difficult challenges. This increase in the computational effort and time required by the client to solve the increasingly difficult challenges results in a slow-down of a rate at which the client can transmit data through the gateway, thereby avoiding or at least reducing possibilities of a DDoS attack and/or avoiding or at least reducing chances of actions being taken based on fake data, as described below in further detail.

Any appropriate type of proof-of-work challenge may be used by the gateway. Described below is a HashCash based proof-of-work challenge used by the gateway, although another type of proof-of-work challenge may be used. The proof-of-work challenge communication between the gateway and a client is described in further detail below.

In an example, a challenge transmitted to a specific client with a specific IP address may be used by the client with the specific IP address to transmit data for a threshold number of times in a given timeframe. Note that the gateway may identify data transmission from a specific client by tracking communications received from a common source attribute associated with the client, such as the IP address of the client. If the threshold number of times is set to 1, the client has to solve a unique challenge each time the client wants to transmit data to the gateway, and the challenge expires with reception of the solution and the accompanying data by the gateway. In an example, the threshold number can be set to 2 or more, and the timeframe can be set to any appropriate time duration, such as 2 minutes, or 10 minutes, or 1 hour, or 6 hours, or the like. In an example, the threshold number can be set to 2 or more, if no suspicious or anomalous activity is detected from the client or its IP address. For example, if the threshold number is set to 2 or more, the client can transmit data from the threshold number of times within a given timeframe, with a single solution to a challenge, as described below in further detail.

Proof-of-Work Challenge for Transmission of Data to a Non-Authenticated Gateway

Figure 1:
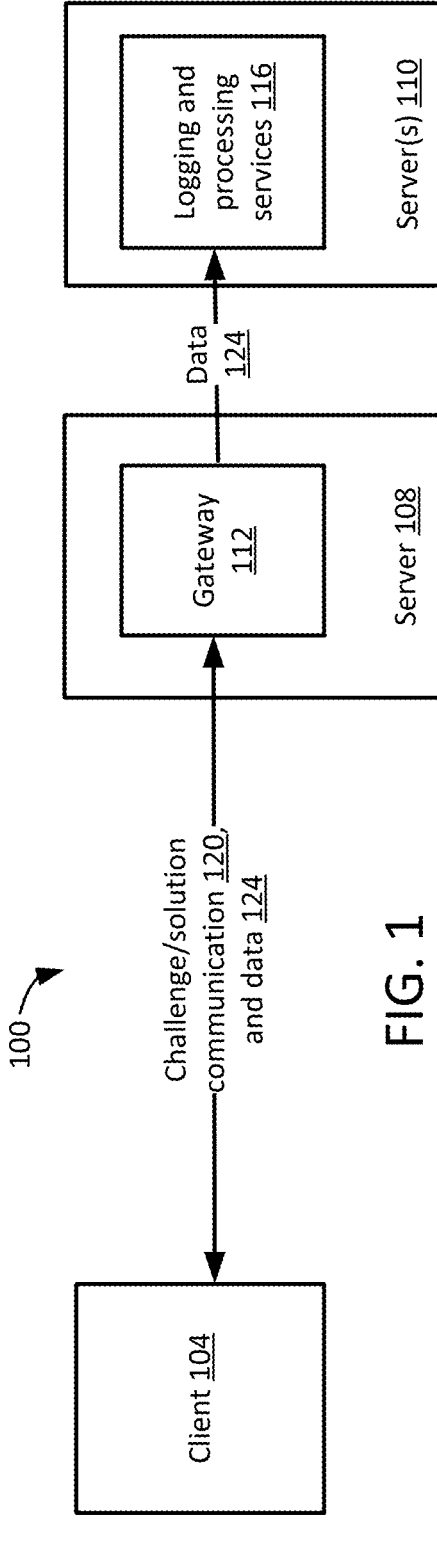
FIG. 1 illustrates a block diagram of a system in which a client is engaged in a challenge/solution communication with a non-authenticated gateway of a server, for transmission of data from the client to the gateway, where the challenge/solution communication involves the server posing a proof-of-work challenge to the client.

FIG. 1 illustrates a block diagram of a system 100 in which a client 104 is engaged in a challenge/solution communication 120 with a non-authenticated gateway 112 of a server 108, for transmission of data 124 from the client 104 to the gateway 112, where the challenge/solution communication 120 involves the server 108 posing a proof-of-work challenge to the client 104.

The gateway 112 provides a gateway for accessing resources within the server 108, and/or within one or more additional services 110. In an example, the gateway 112 is a non-authenticated gateway. The gateway 112 being "non-authenticated" implies that the gateway 112 accepts a connection from any device (e.g., including the client 104), without performing any authentication, identification, and/or authorization of the device sending data to the gateway 112. The gateway 112 does not verify if a client device transmitting data to the gateway 112 is a legitimate client device. Example use cases where the gateway 112 remains non-authenticated are described below. In an example, the gateway 112 receives data from any device, and processes such data, provided the data is accompanied by a valid solution of a challenge, as described below in further detail.

While the gateway 112 may not necessarily be advertised, the gateway 112 may be visible to the public. Thus, any device (such as the client 104 and one or more other devices) can send data to the gateway 112, without a need for such devices to be authenticated and authorized by the gateway to send data to the gateway 112.

The client 104 may be any appropriate client device that wants to transmit data 124 to the gateway 112. In one example, the client 104 may be a legitimate device wanting to transmit the data 124 to the server 108, and the data 124 may be legitimate data. In another example, the client 104 may be a malicious device wanting to transmit the data 124 to the server 108. In any case, as described above, the gateway 112 does not perform authentication, identification, and/or authorization of devices sending data to the gateway 112, and is unaware of an identity of the device sending the data 124. Thus, the gateway 112 does not know if data 124 received by the gateway 112 is legitimate data from a legitimate device, or possibly malicious data from a malicious device.

In an example, the one or more servers 110 also comprises logging and processing services 116. Note that the server(s) 110 and 108 are shown as being different servers, although they may be the same server. Similarly, the server(s) 110 may be implemented using a single server, or a collection of multiple servers. The configuration of the servers 108, 110 are implementation specific. The gateway 112 selectively and conditionally routes the data 124 received from the client 104 to the logging and processing services 116, where criteria for such selective routing of the data 124 to the logging and processing services 116 are described below. The logging and processing services 116 receives the data 124, and logs the data 124, and/or analyzes or processes the data 124.

In an example, a plurality of malicious devices (which may or may not include the client 104) may transmit a large volume of data to the gateway 112. Because the gateway 112 does not know if the received data are from legitimate or malicious devices, the gateway 112 has to transmit such received data to the logging and processing services 116, and the logging and processing services 116 has to log and/or process the large volume of data. Receipt, logging, and/or processing of a large volume of such malicious data may lead to consumption of substantial computing resources of the server 108. This may result in a possibility of a Distributed Denial of Service (DDoS) attack on the server 108 and/or possible undue action(s) taken based on processing and analyzing such malicious and fake data.

Note that the malicious data need not include any virus or malware, or need not be a security threat to the server 108. Rather, processing of such data may unnecessarily consume substantial computational resources of the server 108, thereby potentially leading to the DDoS attack on the server 108 and/or possible undue action(s) taken by the logging and processing services 116 based on such malicious and fake data.

In an example, to prevent or at least reduce chances of such DDoS attack and/or processing of such fake data, the routing of the data 124 from the gateway 112 to a next destination (such as the logging and processing services 116) is conditioned on solving a challenge by the client 104 transmitting the data 124 to the gateway 112. The data 124 to be routed has be sent to the gateway 112 along with a solution to a live challenge. A challenge stays alive only for a threshold number of data transmissions and/or for a threshold period of time, as described below in further detail.

For example, when the client 104 wants to transmit the data 124 to the gateway 112, the gateway 112 transmits a challenge to the client. The client 104 has to solve the challenge, which consumes some computational resources of the client 104. The client 104 then transmits a solution to the challenge, along with the data 124, to the gateway 112. Transmission of the challenge from the gateway 112 to the client 104, and transmission of a solution thereof from the client 104 to the gateway 112 are referred to, in combination, as the challenge/solution communication 120 in FIG. 1.

Upon receiving the solution from the client 104 and verifying that the solution is a valid solution to the challenge, the gateway 112 reroutes the data 124 to the logging and processing services 116, for subsequent processing and/or analyzing of the data.

If the solution is not valid, the gateway 112 may discard the data 124, or may tag the data as being potentially malicious and then route the tagged data to a next destination (e.g., to a logging service, in case the malicious tagged data is to be logged for later analysis). Handling of the data, if the solution is not valid, may vary from one implementation to the next.

In an example, the gateway 112 may monitor a data transmission pattern from an IP address, which may be the IP address of the client 104. Note that the gateway 112 does not identify or authenticate the client 104. Thus, in an example, the gateway 112 identifies communications with the client 104 by tracking communications that share a common source attribute, and the common source attribute is associated with the client 104. A source IP address is an example of the common source attribute. For example, the gateway may monitor data transmission pattern from the same IP address, to identify communications with the client 104.

If incoming data traffic from the client 104 (such as from the IP address of the client 104) to the gateway 112 becomes increasingly suspicious, the gateway 112 adaptively increases a level of difficulty of the challenges that it prompts the client 104 to solve (such as a device at that IP address to solve), thereby also increasing computational effort and time required by the client 104 to solve the increasingly difficult challenges. This increase in the computational effort and time required by the client 104 to solve the increasingly difficult challenges results in a slow-down of a rate at which the client 104 can transmit data through the gateway 112. That is, because the computation resources of the client 104 are used to solve the challenge, it may be difficult for the client 104 to transmit large volume of data to the gateway 112 (e.g., increasingly complex problems consuming increasingly higher computing resource have to be solved prior to sending large volume of data to the gateway 112). This results in avoidance or at least reduction of possible DDoS attacks and/or possible undue actions taken based on processing such fake data.

Figure 2:
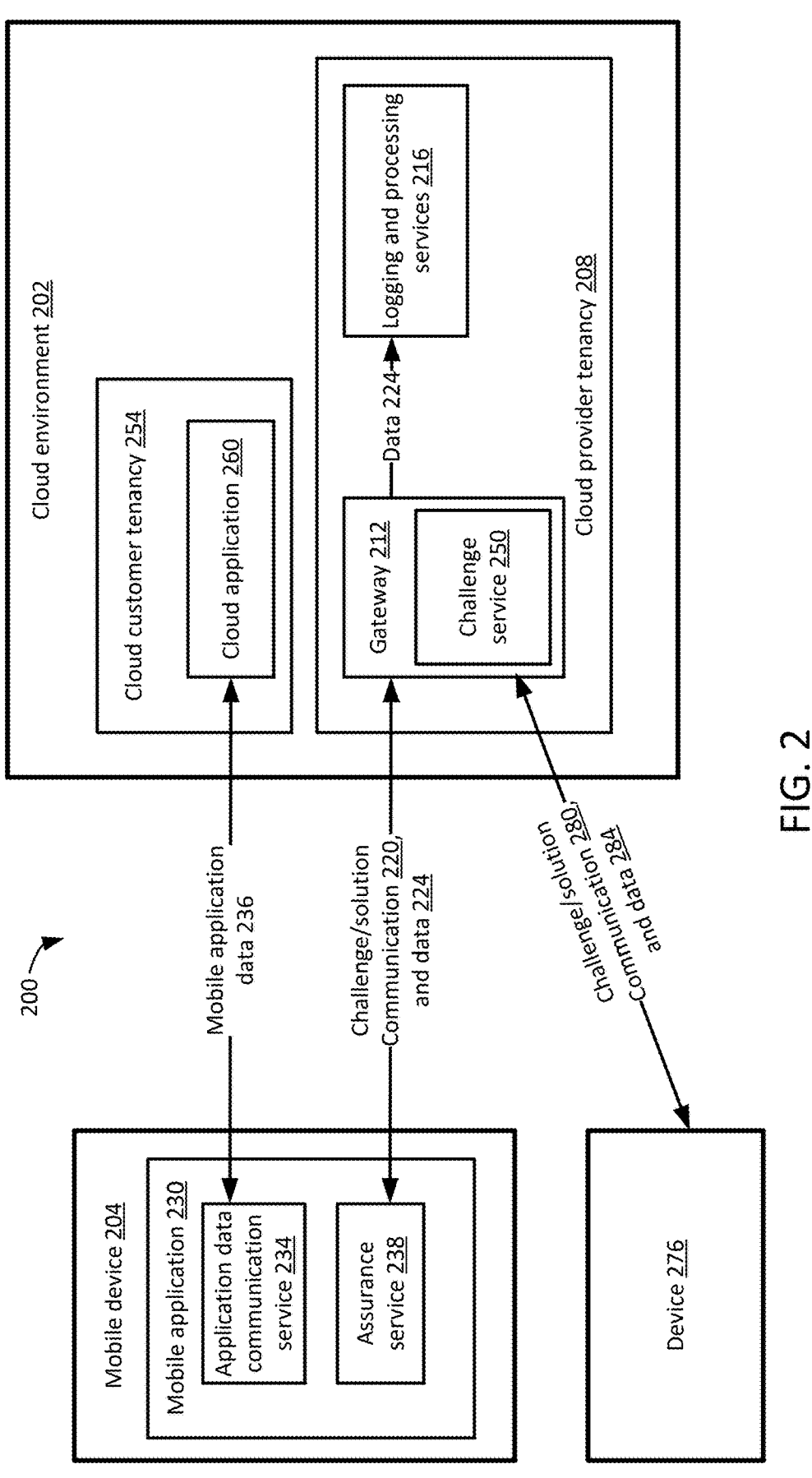
FIG. 2 illustrates a block diagram of a system in which an assurance service associated with a mobile application executing within a mobile device is engaged in a challenge/solution communication with a non-authenticated gateway controlling access to a cloud network, where the challenge/solution communication involves (i) the gateway posing a proof-of-work challenge to the assurance service, and (ii) the assurance service providing a solution to the challenge, where the solution to the challenge is accompanied by data transmitted from the assurance service to the gateway.

FIG. 2 illustrates a block diagram of a system 200 in which an assurance service 238 associated with a mobile application 230 executing within a mobile device 204 is engaged in a challenge/solution communication 220 with a non-authenticated gateway 212 controlling access to a cloud network (such as to a cloud provider tenancy 208), where the challenge/solution communication 220 involves (i) the gateway 212 posing a proof-of-work challenge to the assurance service 238, and (ii) the assurance service 238 providing a solution to the challenge, where the solution to the challenge is accompanied by data 224 transmitted from the assurance service 238 to the gateway 212.

In an example, the system 200 includes a cloud environment 202, which includes a cloud customer tenancy 254 and the cloud provider tenancy 208. As described above, a tenancy is an isolated partition within the cloud environment 202, such that resources in different tenancies are isolated from each other unless explicitly shared. Each tenancy runs a plurality of virtual machine compute instances. A cloud customer tenancy (such as the cloud customer tenancy 254) is rented out to a cloud customer, and the cloud provider tenancy is used by the provider of the cloud environment 202 to provide one or more services to one or more cloud customer tenancies.

As described below in further detail, the assurance service 238 collects data 224 on operations of the mobile application 230, and wants to transmit such data 224 to the cloud provider tenancy 208 through the gateway 212, e.g., to enable the cloud provider tenancy 208 to log and/or process such data 224. Thus, the assurance service 238 of the mobile application 230 executing within the mobile device 204 has valid or legitimate reason to transmit the data 224 to the cloud provider tenancy 208, and hence, the mobile device 204 is termed herein as a "legitimate" device, and the data 224 is termed herein as "legitimate data".

Also assume that another "malicious" device 276 wants to maliciously transmit data 284 to the cloud provider tenancy 208 through the gateway 212. The device 276 is termed as a "malicious" device, because the device 276 does not have a legitimate reason to transmit the data 284 to the cloud provider tenancy 208 through the gateway 212. The device 276 may unintentionally or intentionally want to transmit the data 284 to the cloud provider tenancy 208. In an example, the device 276 may want to cause a DDoS attack of one or more cloud resources within the cloud provider tenancy 208. In another example, because the address of the gateway 212 is publicly available, the device 276 may want to transmit the data 284 to the cloud provider tenancy 208 without any specific reason. For these reasons, the device 276 is termed herein as "malicious" device. Similarly, the data 284 is termed herein as "malicious data," which may be data transmitted to the cloud provider tenancy 208 without a legitimate reason.

Each of the mobile device 204 and the device 276 may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. In an example, the mobile device 204 is configured to install and execute the mobile application 230.

The system 200 includes the cloud environment 202 including a plurality of tenancies, such as the cloud customer tenancy 254 and the cloud provider tenancy 208. The cloud customer tenancy 254 (also referred to herein as tenancy 254) is rented to a cloud customer. The cloud provider tenancy 208 (also referred to herein as tenancy 208) is controlled by the provider of the cloud environment 202, or by an entity managed by or in agreement with the provider of the cloud environment 202.

The cloud customer wants to deploy mobile applications (or mobile apps) to computing devices (such as wireless computing devices, e.g., smartphones and tablets), such as the mobile application 230 deployed within the mobile device 204. When a user opens the mobile application 230 in the mobile device 204, the mobile application 230 communicates with a cloud application 260. The cloud application 260 provides specific functions and services to the mobile application 230 and its end user. The cloud application 260 may be hosted in a cloud environment, e.g., within the cloud customer tenancy 254 of the cloud environment 202, where the cloud customer tenancy 254 may be rented by the provider of the mobile application 230 (e.g., the cloud customer) from the cloud provider.

In an example, the mobile application 230 comprises an application data communication service 234 configured to exchange mobile application data 236 with the cloud application 260 hosted in the cloud customer tenancy 254, through a gateway of the cloud customer tenancy 254 (the gateway of the cloud customer tenancy 254 is not illustrated in FIG. 2). The mobile application data 236 includes any data pertaining to regular operations of the mobile application 230, except for data associated with the assurance service 238. For example, if the mobile application 230 is for viewing videos, the mobile application data 236 includes requests by the mobile application 230 for videos from the cloud application 260, transmission of the videos by the cloud application 260 to the mobile application 230, data associated with authenticating the mobile application 230 to the cloud application 260, exchange of credentials of a user of the mobile device 204, and/or any other appropriate data for regular operation of the mobile application 230.

In the context of software assurance of the mobile application 230, in an example, an additional role of an assurance administrator is added into the picture. The assurance administrator may or may not be the same as a cloud provider that owns the cloud environment 202. In an example, the assurance administrator needs to have a monitoring role or some degree of control over the working of the mobile application 230. Merely as an example, the cloud provider may want to ensure that the mobile application 230 transmits relevant mobile application data 236 (e.g., including user data) to the cloud customer tenancy 254, and does not communicate with or transmit data to any unauthorized third party. The cloud provider (or another authorized party) may want to ensure that the mobile application 230 does not provide any service or functionality that have not been pre-authorized or pre-agreed between the mobile application provider and the cloud provider (e.g., including transmission of user data to an unauthorized party). Thus, the cloud provider acts as a software assurance administrator, e.g., acts in a monitoring role to ensure that the mobile application 230 is working as intended.

To maintain such supervisory control and/or monitoring role over the mobile application 230, the cloud provider (or the provider of the mobile application) packages the assurance service 238 with the mobile application 230. The assurance service 238 is a software library packaged with the mobile application 230. In an example, the assurance service 238 is developed by the cloud provider. For example, a binary version of the assurance service 238 is packaged with the mobile application 230. For example, the cloud provider requires or instructs the cloud customer to package the assurance service 238 with the mobile application 230.

Whenever a user of the mobile device 204 downloads and installs the mobile application 230 in the mobile device 204, the assurance service 238 is also downloaded and installed in the mobile device 204 along with the mobile application 230. The assurance service 238 and its operation may be transparent and undetectable to the end user of the mobile application 230. For example, the end user may not even be aware of the downloading and installation of the assurance service 238, as the assurance service 238 is packaged with the mobile application 230.

The assurance service 238 generates a mobile sandbox environment within the mobile application 230, and hence, the assurance service 238 is also referred to herein as a mobile sandbox, or a sandbox, or a mobile sandbox library, or a sandbox library, or a library. The assurance service 238 monitors the behavior of the mobile application 230, and generates data 224.

The assurance service 238 reports the data 224 to the cloud provider tenancy 208. Note that the data 224 is transmitted to the cloud provider tenancy 208 for logging and analysis, and may not be provided to the cloud application 260 hosted by the cloud customer tenancy 254.

The gateway 212 receives the data 224 from the assurance service 238, and conditionally reroutes the data 224 to the logging and processing services 216 of the cloud provider tenancy 208. For example, the assurance service 238 reroutes the data 224 to the logging and processing services 216, if the data 224 from the assurance service 238 to the gateway 112 is accompanied by a valid solution of a live challenge, as described below.

The logging and processing services 216 of the cloud provider tenancy 208 performs software assurance and review process on the data 224 received from the assurance service 238. Thus, the assurance service 238 provides telemetry services to the cloud provider tenancy 208. The logging and processing services 216 store and log the data 224, and perform analysis of the data 224, e.g., to detect any suspicious, malicious, or anomalous activity or behavior of the mobile application 230, and potentially undertake corrective actions (or generate reports, based on which corrective actions may be undertaken). The data 224 is also referred to as telemetry data, as the tenancy 208 (such as the logging and processing services 216) provides telemetry services on the mobile application using the data 224. The data 224 includes, for example, logs, messages, and/or other telemetry data generated by the assurance service 238.

Although FIG. 2 illustrates a single instance of the mobile application 230 executing within a single mobile device 204, multiple such mobile applications 230 are likely to be deployed in corresponding multiple mobile devices, where each such mobile application also includes a corresponding assurance service.

In an example, it may be difficult to establish trust between the cloud provider tenancy 208 and each of a plurality of assurance services operating in a plurality of mobile applications deployed in a plurality of mobile devices. For example, due to the public access to the assurance service, it may be unpractical or undesirable to provide private cryptographic keys to the assurance service. In an example, an assurance service running on a mobile application can share the private key or secret with the end user, and the end user can load and share it with the assurance service when the mobile application initializes. But it may be undesirable or unsafe to share the private key or secret with the end user.

For a regular mobile application (including the above-described mobile application 230) running on a mobile device, a separate user login/verification process is initiated, as a result of which the mobile application can be trusted by the corresponding cloud application. Thus, the cloud application 260 can trust the mobile application 230, as the mobile application 230 has been verified to the cloud application 260 using a login/password process (or another appropriate user verification process, such as using user biometric, or a passkey). Thus, a gateway within the cloud customer tenancy 254 (where the gateway is not illustrated in FIG. 2), which receives the mobile application data, may be a "authenticated" gateway, as the gateway has authenticated, identified, and/or authorized mobile applications sending data to the gateway.

However, the assurance service 238 is a third-party library running on the mobile application 230, and it is intended that the assurance service 238 remain transparent to the end user. Accordingly, there may not be a separate user login/password authentication process or another type of authentication process specifically for the assurance service 238. Also, the cloud provider may not want to rely on the login/password of the mobile application, for authentication, identification, and/or authorization of the assurance service 238.

Accordingly, due to a lack of an authentication process for the assurance service 238, it may be difficult to establish trust between the cloud provider tenancy 208 and the assurance service 238. Accordingly, in one example, the cloud provider (such as an identity and access management or IAM service of the cloud provider) may refrain from assigning an identity to the assurance service 238 that can be relied upon for authentication and authorization purposes.

Because the gateway 212 does not assign identities to the assurance services running on various mobile devices, the gateway 212 may not be able to authenticate, identify, and/or authorize legitimate mobile devices sending data to the gateway 212. Accordingly, the gateway 212 is a non-authenticated gateway. Thus, the gateway 212 does not authenticate or identify if a client device transmitting data to the gateway 212 is a legitimate client device having legitimate reasons to transmit data to the gateway 212, or is a malicious device transmitting malicious data. Thus, any device (such as the legitimate mobile device 204, and the malicious device 276) can send data to the gateway 212, without a need for such devices to be authenticated by the gateway 212 to send data to the gateway 212, thereby resulting in a possibility of DDoS attack described above and/or possibility of undue actions taken based on processing large volume of fake data.

Thus, as also described above, to prevent or at least reduce chances of such DDoS attack and/or processing large volume of fake data, the routing of the data 224 from the gateway 212 to a next destination (such as the logging and processing services 216) is conditioned on solving a challenge by the mobile device 204. For example, the gateway 212 comprises a challenge service 250 for generating challenges and validating its solution. In an example, a complexity of the challenge is selected adaptively (e.g., based on a pattern of data traffic being received from a particular device or a particular IP address), which further facilitates in deterring DDoS attacks and/or having to process large volume of fake data, as described below in further detail.

Figure 3:
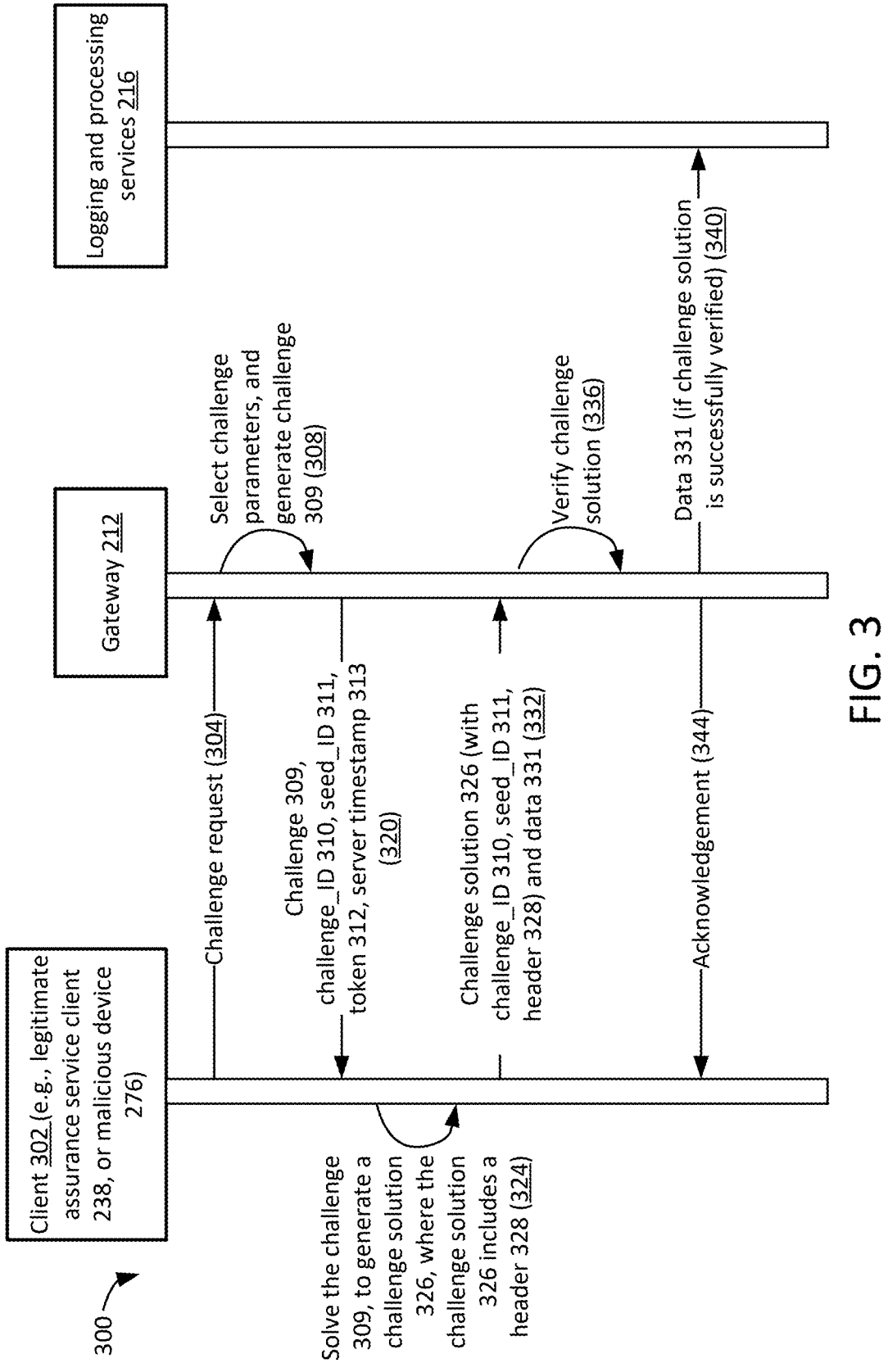
FIG. 3 illustrates flow diagram depicting a challenge/solution communication between a client and a gateway of a cloud network, and transmission of data from the client to the gateway.

FIG. 3 illustrates flow diagram 300 depicting challenge/solution communication between a client 302 and the gateway 212 of the cloud provider tenancy 208, and transmission of data 331 from the client 302 to the gateway 312. The client 302 of the flow diagram 300 can be any device or client wanting to transmit data to the gateway 212. In an example, the client 302 can be the assurance service 238 of the mobile application 230 being executed within the mobile device 204. In another example, the client 302 can be a web browser or another appropriate service of the malicious device 276 wanting to transmit data to the gateway 212. Thus, the client 302 may be any device wanting to transmit data to the non-authenticated gateway 212, and the gateway 212 may not be able to authenticate if the transmitting client 302 is indeed a legitimate assurance service 238 or a malicious device (such as the device 276).

The flow diagram 300 includes, at 304, receiving a challenge request at the gateway 212, e.g., from the client 302. In an example, the challenge request is received at a "get challenge" endpoint of the gateway 212. For example, in order to transmit data to the gateway 212, the initial process is to receive a challenge, such as via the challenge request of 304. Note that the gateway 212 (such as the challenge service 250) does not know if the client 302 transmitting the challenge request is a legitimate assurance service (such as the assurance service 238), or is a malicious device (such as the device 276).

Subsequently, at 308, the gateway 212 selects one or more challenge parameters, and generates a challenge 309 based on the selected challenge parameters. In an example, selecting a challenge parameter involves (i) selecting a complexity level for the challenge, and (ii) selecting the challenge parameters based on the selected complexity level. In an example, the complexity level for the challenge is selected adaptively, as described below in further detail.

In an example, an appropriate type of proof-of-work challenge may be used. A proof-of-work challenge is a form of cryptographic proof in which one party (such as the client 302) proves to another party (such as the gateway 212) that a certain amount of computational effort has been expended to arrive at a solution to the challenge. Several types of proof-of-work exist, and an appropriate type of proof-of-work challenge may be selected by the gateway 212 at 308. Examples of various proof-work-work challenge types include determining an integer square root modulo, weaken Fiat-Shamir signatures, Ong-Schnorr-Shamir signature broken by Pollard, partial hash inversion, hash sequences, HashCash challenge, puzzles, Diffie-Hellman-based puzzle, Mbound, Hokkaido, Cuckoo Cycle, Merkle tree-based challenge, guided tour puzzle protocol, and/or the like.

Some of the description below assumes that the gateway 212 uses HashCash type of proof-of-work challenge, although other types of proof-of-work challenge may also be used.

Merely as an example and where the challenge is generated using a HashCash process, the gateway 212 (such as the challenge service 250 within the gateway 212) at 320 transmits the challenge 309, a challenge identifier 310 ("challenge_ID 310" in FIG. 3), an identifier 311 of a seed used for generating the challenge ("seed_ID 311" in FIG. 3), a token 312, and/or server timestamp 313 to the client 302, as described below in further detail.

In an example, the challenge 309 specifies a requested number of leading zeros, which defines a complexity of the challenge 309. The client 302 is challenged to generate a header including the token 312, the server timestamp 313, and a random number. The client 302 then encrypts the header, and the resultant encrypted string has to start with the predefined requested number of leading zeros (e.g., for the solution to be a valid solution). The client 302 can find this string by trying different random numbers, and has to generate the resultant string via a brute force method. A correct response proves that the client 302 has spent enough computational resources to find such a number. Note that if a different proof-of-work challenge is used for generating the challenge, this process may be appropriately modified.

Also note that the computational resources used by the gateway 212 for generating the challenge 309 and/or to validate the solution may be substantially less and negligible compared to the computational resources used by the client 302 to arrive at the valid solution.

In further detail, in an example and as illustrated in FIG. 3, when the gateway 212 receives a challenge request on the "get challenge" endpoint, the gateway 212 generates the token 312 by hashing two or more pieces of information associated with the system 200. In an example, the gateway 212 generates the token 312 by hashing an IP address of the client 302 (e.g., <client_IP>) with a seed having the seed_ID 311 identifying the seed. In an example, the seed comprises one or more of universal unique identifiers (UUIDs), which may be stored by the gateway 212 in a repository within the tenancy 208. The gateway 212 assigns a challenge identifier 310 (challenge_ID 310) to the challenge 309. The challenge ID 310 uniquely identifies the challenge 309. The server timestamp 313 is a timestamp indicating a time of generation of the challenge 309 at the gateway 212.

The gateway 212 also selects a requested number of leading zeros that the solution to the challenge has to have for the solution to be valid. As described below, the requested number leading zeros defines a complexity of the challenge. For example, the higher the requested number of leading zeros, the more complex is the challenge, and vice versa. The requested number of leading zeros is configurable or selectable by the gateway 212, and is appropriately selected to correspondingly tune the complexity of the challenge.

The gateway 212 transmits the challenge (including the requested number of leading zeros), challenge identifier 310, the seed identifier 311, the token 312, and the server timestamp 313 to the client. Note that the challenge identifier 310, the seed identifier 311, the token 312, and/or the server timestamp 313 may be a part of the challenge 309, or may be accompanied by the challenge 309 to the client 302. The challenge identifier 310, the seed identifier 311, the token 312, and/or the server timestamp 313 defines the challenge 309.

As described above, in an example, the token 312 is generated based on the seed ID 311 and the client IP address. Thus, the token 312 is unique to each client IP address and challenge pair. Because the seed ID 311 and the client IP address are unique to each client device, the token may also be unique to each device. Addition of the above described server timestamp 313 contributes further to the uniqueness and randomness of the challenge, such that no two challenges may be the same.

In an example, because a client IP address is unique to each client, the token, and hence, the challenge, is also unique for each client. However, there may be examples where multiple client devices can be behind a single IP address. For example, a single IP address may be shared among many users, such as multiple devices behind a proxy, devices within a college network, devices within a corporate network, and/or an ISP using Network address translation (NAT). In such a situation, two different clients can have the same IP addresses. However, each client receives a corresponding unique challenge with a unique seed used to generate the challenge. Also, as the token is a hash of the client IP address and a unique seed associated with the challenge, the token and the corresponding challenge will be different and unique for each of the clients behind the same IP address. Also, the solution to the challenge has to be based on the server timestamp 313, and this further contributes to the uniqueness and randomness of the challenge.

Thus, if the gateway 212 transmits multiple challenges to multiple client devices, each of the challenges will be unique (e.g., due to the unique seed, unique server timestamp, possibly different client IP address, and/or possibly different requested number of leading zeros for different challenges). Similarly, if the gateway 212 transmits a series of challenges to a single client device, each of the challenges will also be unique (e.g., due to the unique seed, unique server timestamp, and/or possibly different requested number of leading zeros for different challenges).

At 320, the client 302 receives the challenge 309, the challenge identifier 310, the seed identifier 311, the token 312, and/or the server timestamp 313. At 324, the client 302 solves the challenge 309, to generate a challenge solution 326. For example, for a challenge based on the above described HashCash problem, the client 302 iteratively generates a header 328 that includes the token 312, the server timestamp 313, the requested number of leading zeros, a random number, and a counter. An example header 328 may have a structure as follows:

Header 328→1:<requested_leading_zeros>:<monitoring service_timestamp>:<token>::<base64 encoded random string>:<base64 encoded counter>

Note that while an example structure of the header 328 is described above, the structure of the header 328 may be different in other examples.

For example, the client 302 iteratively generates different headers, until the header provides a valid solution. For example, the client 302 iteratively changes the counter and the random number within the header, e.g., to find a header, which, when hashed using an appropriate pre-agreed algorithm, results in the requested number of leading zeros of the challenge 309.

Thus, for example, the client 302 generates a first header based on a first counter and a first random number, and determines if the first header is a valid solution. To check if the first header is a valid solution, the client 302 hashes the first header using the pre-agreed algorithm. If the hashed header has the requested number of leading zeros (e.g., the requested number of bits with values of zero at the beginning of the computed hashed value), then the solution is a valid solution. If the solution is not a valid solution, the client 302 increments the counter (e.g., by one), regenerates a second random number, and generates a second header based on the incremented counter and the second random number. The client 302 then determines if the second header is a valid solution. This process is iteratively repeated, until a valid solution is determined by the client 302. The valid solution comprises a header including a specific counter and a specific random number, where the header, when hashed using the pre-agreed algorithm, results in the requested number of leading zeros. The algorithm for hashing the header can be any appropriate hashing algorithm, and in one example, is a secure sash algorithm 1 (SHA1 algorithm). Once the client 302 finds the header 328 resulting in the valid solution 326, the header 328 acts as a proof-of-work, e.g., implicitly proving that the client 302 has devoted computational resources to find the solution 326.

Thus, at 324, the client 302 finds the header 328 for the valid solution 326. At 332, the client 302 transmits to the gateway 212 the challenge solution 326, along with data 331. In an example where the client 302 is the assurance service 238 of the mobile application 230 being executed within the mobile device 204, the data 331 is the telemetry data 224 that the assurance service 238 has collected by monitoring operations of the mobile application 230. Thus, in this example, the data 331 is the legitimate data 224 that the legitimate assurance service 238 wants to transmit to the gateway 212.

In another example where the client 302 is the malicious device 276, the data 331 is the malicious data 284 that the device 276 wants to transmit to the gateway 212, e.g., as a part of a DDoS attack, or wants to otherwise transmit to the gateway 212 without any legitimate reason. Note that the malicious data 284 need not include any virus or malware, or need not be a security threat to the tenancy 208. Rather, processing of such data 284 may unnecessarily consume substantial computational resources of the tenancy 208, thereby potentially leading to the DDoS attack described above.

As described above, the challenge solution 326 is derived by the client 302. For example, the challenge is set such that the solution 326 to the challenge is to be derived by the client

302 using computational cycles of the client 302, without any intervention by an end user of the device and/or without the end user of the device providing the solution. Thus, the end user is not involved in generating the solution, and the end user may be unaware of the client 302 solving the problem. Thus, a derivation of the solution 326 to the challenge is transparent to the end user of the client 302. For example, for a legitimate use case where the end user is the user of the mobile application 230, operations of the assurance service 238 may be transparent to the end user. Accordingly, the user need not be bothered about the assurance service 238 transmitting data to the gateway 212. Hence, the end user is involved in solving the challenge.

In an example, the challenge solution 326 and the data 331 may be concatenated to have the following structure:
POST/
logs?logId=<log_id>&challenge_id=<challenge_id>& challenge_seed_id=<seed_id>&challenge_result= <header that generates_the requested_number_of_lea- ding_zeros>

In the above example, the log refers to a log that includes the data 331. The challenge_id refers to the challenge identifier 310 that the gateway 212 has sent to the client 302 earlier at 320. The challenge_seed_id refers to the seed identifier 311 that the gateway 212 has sent to the client 302 earlier at 320. The challenge result includes the header 328, which, when hashed, generates the requested number of leading zeros. Thus, the challenge solution 326 includes the challenge identifier 310, the seed identifier 311, and the header 328 that was calculated by the client 302.

Also, note that as described above, the header 328 includes the token 312, the server timestamp 313, the requested number of leading zeros, the random number, and the counter, where the random number and the counter were iteratively calculated by the client 302 to generate the header 328 resulting in a valid solution. Note that while an example structure of the concatenation of the challenge solution 326 and the data 331 is described above, the structure of the concatenation of the challenge solution 326 and the data 331 may be different in other examples.

The gateway 212 receives the challenge solution 326 and the data 331 at 332. At 336, the gateway 212 verifies the challenge solution 326. For example, upon receiving the challenge solution 326, the gateway 212 ensures that the challenge identifier 310 and the seed identifier 311 are valid.

The gateway 212 also reads the server timestamp 313 from the generated header 328. In an example, the gateway 212 ensures that the server timestamp 313 is within a threshold time duration (e.g., 1 minute, or 2 minutes) from the current time. Thus, the client 302 has the threshold time duration to receive the challenge 309, solve the challenge 309, and provide the solution 326 to the gateway 212. If the solution 326 is received after the threshold time duration from the server timestamp 313, the solution 326 may be declared invalid by the gateway 212.

The gateway 212 also reads the token 312 within the header 328, and verifies that the token 312 is indeed the hash of the IP address of the client 302 and the seed that is identified by the seed identifier 311. Such a check ensures that the client 302 has solved the challenge 309 assigned to the client 302, and has not solved any other challenge.

The gateway 212 then checks for validity of the header 328 within the solution 326. For example, the gateway 212 encrypts the header 328 (e.g., using the pre-agreed encryption algorithm, such as the SHA1 algorithm, or another appropriate algorithm), and generates the hash of the encrypted value of the header 328. Then the gateway 212 verifies that the hash of the encrypted value of the header 328 has the requested number of leading zeros (e.g., where the requested number of leading zeros was transmitted by the gateway 212 to the client 302 as a part of the challenge 309. Thus, the computed hash of the encrypted value of the header 328 has to have the requested number of bits with values of zero at the beginning of the computed hashed value.

In an example, verifying the challenge identifier 310, the seed identifier 311, the token 312, and the hash of the encrypted value of the header 328 results in the gateway 212 verifying, at 336, the challenge solution 326.

Upon successfully verifying the challenge solution 326 at 336, the gateway 212 reroutes the data 331 to one or more downstream services, such as the logging and processing services 216, for logging and later analysis. Furthermore, at 344, the gateway 212 returns an acknowledgement to the client 302. The acknowledgement can acknowledge that the challenge solution 326 is valid, and that the data 331 is rerouted to the logging and processing services 216 for logging and processing.

On the other hand, if the gateway 212 cannot successfully verify the challenge solution 326 (e.g., if the header 328 is not a valid solution to the challenge 309), then the gateway 212 may discard the data 331, or may tag the data 331 as being potentially malicious and then reroute the tagged data to a next destination (e.g., to a logging service, in case the possibly malicious and tagged data 331 is to be logged for later analysis). In any case, handling of such tagged data accompanied by an invalid challenge solution is different from handling of legitimate data accompanied by a valid challenge solution.

In an example, responsive at least in part to verifying that the solution to the challenge is invalid, the gateway 212 determines an IP address of the sending client, and blocks additional challenge requests from the IP address from at least a threshold period of time. This prevents a malicious client from sending repeated invalid solutions to the gateways. In an example, the threshold period of time may be adaptively made longer, e.g., if multiple invalid solutions are received from the IP address. Additionally, or alternatively, the gateway may transmit a new challenge to the client, where the new challenge is more complex than the previous challenge for which the invalid solution was received. In an example, the new and more complex challenge is expected to require more computation cycles to solve than solving the original challenge.

In an example, the computational resources used by the gateway 212 for generating the challenge 309 and/or to validate the solution 326 may be substantially less and negligible compared to the computational resources used by the client 302 to arrive at the valid solution 326.

In an example, data may also be received unsolicited from a device by the gateway 212. For example, such data may not be accompanied by any solution and/or may not be in response to a transmission of any challenge to the device. The gateway 212 tags such data as possibly malicious, and appropriate operations are undertaken for the tagged malicious data. In one example, the gateway 212 discards the tagged data. In another example, the gateway routes the tagged data to a next destination (e.g., to a logging service, in case the malicious tagged data is to be logged for later analysis). In any case, handling of such tagged data transmitted without any challenge solution is different from handling of legitimate data accompanied by a valid challenge solution. In an example, if such unsolicited data is received, the gateway determines an IP address of the sending device, and blocks any challenge requests from the IP address from at least a threshold period of time. In an example, the threshold period of time may be adaptively made longer, e.g., if multiple instances of unsolicited data are received from the IP address of the device. Additionally, or alternatively, the gateway may transmit a new challenge to the device, where the new challenge is highly complex.

Thus, in an example, when the client 302 wants to transmit data to the gateway 212, the client 302 has to go through the above-described challenge/solution process of FIG. 3.

Adaptive Selection of Challenge Complexity and/or Challenge Type

In an example and as described above, the gateway 212 does not issue an identity to a client, and hence, the gateway 212 may not be easily able to identify if a same client is transmitting data multiple times. That is, the gateway 212 may not be easily able to identify data transmission pattern from a specific client. Accordingly, instead of monitoring data transmission patterns from a client, the gateway 212 monitors data transmission pattern from an IP address of the client, as also described above.

In an example, a legitimate client, such as the assurance service 238, may periodically transmit data 224 to the gateway 212, such as once every 6 hours, or once every 12 hours, or once every day, or with another appropriate periodicity. Thus, a legitimate client may have a specific data transmission pattern. For example, the assurance service 238 may transmit data at most a prespecified threshold number of times during a prespecified threshold time duration. If a client (such as an IP address of the client) transmits data to the gateway 212 in an acceptable or known data transmission pattern, then complexity of challenges transmitted to the client may be selected to be relatively easy (such as with a requested lower number of leading zeros), which the client (such as the assurance service 238) can solve with relatively fewer computation cycles of the mobile device 204, without unduly burdening the mobile device 204 with solving the challenge.

However, data transmission pattern from an IP address of another client (such as the malicious device 276) may be suspicious. For example, if there is any deviation or anomaly from the expected pattern of receiving data and/or larger than expected data from an IP address, the challenges to the client at that IP address may be made increasingly complex. For example, assume that within a 6-hour window, a legitimate assurance service 238 is supposed to transmit two logs to the gateway 212. Thus, for the first two data transmission from the client within the 6-hour window, the challenge complexity is kept low, such that computational burden to solve that challenge is minimal. For a third and a fourth data transmission from the client within the 6-hour window, the challenge complexity is kept medium, such that computational burden to solve that challenge is moderate. For a fifth and a sixth data transmission from the client within the 6-hour window, the challenge complexity is kept high, such that computational burden to solve that challenge is high. For a seventh, an eighth, and any subsequent data transmission from the client within the 6-hour window, the challenge complexity is kept very high, such that computational burden to solve that challenge is very high. Thus, the challenge complexity is made progressively higher, with higher deviation of the data transmission from an expected data transmission pattern.

Thus, if a malicious client (such as the device 276) wants to transmit large volume of data as a part of DDoS attack and/or wants to transmit large volume of fake and malicious data, the gateway 212 adaptively increases the level of difficulty of the challenges that it prompts the client to solve, thereby also increasing computational effort and time required by the client to solve the increasingly difficult challenges. This increase in the computational effort and time required by the client to solve the increasingly difficult challenges results in a slow-down of a rate at which the client can transmit data through the gateway 212. That is, because the computation resources of the client are used to solve the challenge, it may be difficult for the client to transmit large volume of data to the gateway 212 (e.g., increasingly complex problems consuming increasingly higher computing resource have to be solved prior to sending large volume of data to the gateway 212). This results in avoidance or at least reduction of possible DDoS attacks and/or possible transmission of large volume of fake and malicious data.

In an example, an expected pattern of receiving legitimate telemetry data from a legitimate source (such as the assurance service 238) may be predetermined, e.g., by a human operator of the cloud provider tenancy 208, by the gateway 212, and/or by an artificial intelligence (AI) model that is trained on previous patterns of data from a large number of valid assurance services. Any deviation of data transmission from an expected data transmission pattern results in increasing complex challenge transmitted to the client.

In an example, the complexity of the challenges can be configured using one of many different ways. For example, for the above described HashCash challenge, the gateway 212 can configure the requested number of leading zeros in the solution, e.g., to correspondingly configure the complexity of the challenge. The higher the number of leading zeros, the more complex is the problem.

Another manner to configure challenge complexity is to use a different type of challenge/solution framework (or proof-of-work framework). Merely as an example, the Hash-Cash framework may be used to generate challenges with a first range of complexity, and another proof-of-work framework may be used to generate challenges with a second range of complexity, where the first and second ranges may be at least in part non-overlapping.

As described above, in an example, a simple challenge can be solved by the client using a relatively a smaller number of computation cycles, a moderately complex challenge can be solved by the client using a moderate number of computation cycles, and a highly complex challenge can be solved by the client using a relatively higher number of computation cycles. In general, for solving a simple challenge, no significant amount of computational resources may be used by the client. Thus, if expected or legitimate telemetry data is received from the assurance service 238, the client is deemed to be a genuine assurance service 238 transmitting genuine telemetry data, and the challenge complexity may be kept low, thereby not unduly burdening the genuine mobile device 204 and the assurance service 238 therewithin with high computational cost for solving the challenge. However, if malicious data transmission is suspected and/or larger than expected volume of telemetry data is received from a specific IP address, the challenge complexity may be increased progressively, thereby making is progressive difficult to mount a DDoS attack on the cloud provider tenancy 208.

Challenge Lifespan

In an example, a challenge (such as the challenge 309) transmitted to a specific client with a specific IP address (such as the client 302) may be used by the client 302 with the specific IP address to transmit data for a threshold number of times in a given timeframe. Note that the gateway 212 may identify data transmission from an IP address of the client, as also described above.

If the threshold number of times is set to 1, the client 302 has to solve a unique challenge each time the client 302 wants to transmits data to the gateway 212, and the challenge expires with reception of the solution and the accompanying data by the gateway 212.

In an example, the threshold number can be set to 2 or more, and the timeframe can be set to any appropriate time duration, such as 2 minutes, or 10 minutes, or 1 hour, or 6 hours, or the like. In an example where the timeframe is infinite, the client may transmit data for the threshold number of times, without a timeframe for transmitting the data.

Note that in an example, the threshold number can be set to 2 or more, if no suspicious or anomalous activity is detected from the client 302 or its IP address. For example, if the threshold number is set to 2 or more, the client 302 first checks to see if the client 302 has a solution to a challenge that was previously solved by the client 302 and if the challenge is still live. If the client used the solution to the same challenge a number of times that is less than the threshold number, then the challenge is still live within the given timeframe. Accordingly, in an example, the client 302 can just transmit the data to the gateway, without any accompanying solution (e.g., provided that the data is transmitted within the specified timeframe). In another example, the client 302 transmits the data to the gateway 212, along with the previously solved solution and/or the identifier of the challenge solved previously by the client.

In an example, when a client 302 requests a challenge (e.g., challenge request), the gateway 212 transmits the challenge (e.g., the challenge 309) to the client 302 (as described above with respect to FIG. 3), e.g., along with the threshold number of times this challenge 309 can be used to transmit data. The client 302 records the threshold number of uses, and solves the challenge. For example, the client 302 initiates a client-side counter to track a remaining number of times the same challenge and same solution can be used to transmit data. The client 302 sends the data and the challenge solution 326, and decrements the client-side counter by one. The gateway 212 validates the challenge solution 326, and records that the challenge solution 326 has been used one time, and records an additional number of times the same challenge solution 326 can be used from specifically the IP address of the client 302. For example, the gateway 212 initiates a server-side counter to track a remaining number of times the same challenge and same solution can be used to transmit data.

The gateway 212 also tracks a timeframe for which the challenge solution 326 is valid. The gateway 212 verifies the challenge solution 326 and reroutes the data to the logging and processing services 216. The gateway 212 decrements the server-side counter by one.

Now, if the client 302 wants to send additional data within the timeframe and assuming that the client-side counter is greater than zero, the client 302 may transmit the additional data, without getting a new challenge from the gateway 212. The additional data may be transmitted without any challenge solution, or may be accompanied by one or more of (i) the challenge identifier of the previously solved challenge, (ii) the previously solved challenge solution 326, and/or (iii) one or more parameters that the challenge solution 326 may include. Once the additional data is transmitted, the client decrements the counter by one.

The gateway 212 determines that the additional data is from the IP address of the client 302, and determines whether a challenge is still alive for that IP address. For example, the gateway 212 determines if the challenge has been used to transmit data for at least the threshold number of times (e.g., if the server-side counter is greater than zero) and if the current time is within the timeframe of validity of the challenge solution 326. If the challenge is still alive, the gateway 212 successfully reroutes the additional data to the logging and processing services 216.

If on the other hand the challenge is not alive, the gateway 212 informs the client about the challenge being not alive. Additionally (or alternatively), the gateway 212 tags the additional data as being possibly malicious, and handles the malicious in one of the various example techniques described above. In an example, upon receiving a message form the gateway 212 that the challenge is not alive, the client may choose to get a new challenge from the gateway 212, to transmit the additional data.

Thus, the same challenge and the solution can be used for more than one time within a given time frame, thereby lessening the computation burden of genuine assurance services wanting to transmit genuine telemetry data to the gateway 212. The client can transmit data without solving a new challenge, as long as the client-side counter is greater than zero, and the current time is within the timeframe of validity of the challenge solution 326. Similarly, the gateway 212 can process and reroute data without requiring solution to a new challenge, as long as the server-side counter is greater than zero, and the current time is within the timeframe of validity of the challenge solution 326.

Methodologies

FIG. 4 is a flow diagram depicting a method 400 for challenge/solution communication between a gateway of a cloud network (such as a gateway providing access to a cloud provider tenancy) and a device, for transmission of data from the device to the gateway, where the challenge/solution communication involves the gateway posing a proof-of-work challenge to the device.

The gateway of the method 400 may be any of the gateways described above, such as the gateway 112 or 212. The device of the method 400 may be any of the devices described above, such as the client 104, the mobile device 204, or the device 276. Thus, in one example, the device of the method 400 may be a legitimate device that includes the assurance service 238, where the assurance service 238 transmits legitimate telemetry data to the gateway 212. In another example, the device of the method 400 may be a malicious device that transmits malicious data to the gateway 212.

The method 400 includes, at 404, receiving, by a gateway and from a device, a challenge request. Reception of a challenge request has been described above with respect to process 304 of FIG. 3.

The method 400 proceeds from 404 to 408. At 408, (i) a pattern of data traffic from an IP address of the device is determined; (ii) based on the pattern, a type of a challenge and/or a complexity level of the challenge is selected; and (iii) the challenge is generated, based on the selected type and/or the selected complexity level of the challenge.

Pattern of data traffic from the device is determined, for example, by tracking the pattern of data transmission received from the IP address of the device. As described above, in one example, the pattern of data traffic from the IP address of the device may be adhere to an acceptable or known data transmission pattern, in which case a relatively easier challenge type and/or a challenge with low complexity level may be selected. In another example, the pattern of data traffic from the IP address of the device may indicate deviation or anomaly from the expected pattern of receiving data and/or larger than expected data from an IP address. In such an example, a relatively difficult challenge type and/or a challenge with high complexity level may be selected.

As described above, the complexity level may be progressively increased, as the deviation or anomaly from the expected pattern increases. In an example, the complexity level may be controlled by selecting an appropriate number of leading zeros requested in the solution, as described above. Furthermore, generation of a challenge has been described above with respect to process 308 of FIG. 3.

The method 400 proceeds from 408 to 412. At 412, the challenge is transmitted by the gateway and to the device, e.g., as also described above with respect to process 320 of FIG. 3.

The method 400 proceeds from 412 to 416. At 416, a solution to the challenge is received by the gateway and from the device, where the solution accompanies data, e.g., as also described above with respect to process 332 of FIG. 3.

The method 400 proceeds from 416 to 420. At 420, a validity of the solution to the challenge is verified by the gateway, e.g., as also described above with respect to process 336 of FIG. 3.

The method 400 proceeds from 420 to 424. At 424, a decision is made as to whether the solution is valid, e.g., as also described above with respect to process 336 of FIG. 3. If "No" at 424, the solution is not valid, and the method 400 proceeds from 424 to 428. At 428, the gateway tags the data as possibly malicious, and appropriate operations are undertaken for the tagged malicious data. In one example, the gateway 212 discards the tagged data. In another example, the gateway routes the tagged data to a next destination (e.g., to a logging service, in case the malicious tagged data is to be logged for later analysis). In any case, handling of such tagged data accompanied by an invalid challenge solution is different from handling of legitimate data accompanied by a valid challenge solution.

In an example, responsive at least in part to verifying that the solution to the challenge is invalid, the gateway determines an IP address of the device, and blocks additional challenge requests from the IP address from at least a threshold period of time. This prevents a malicious device from sending repeated invalid solutions to the gateways. In an example, the threshold period of time may be adaptively made longer, e.g., if multiple invalid solutions are received from the IP address of the device. Additionally, or alternatively, the gateway may transmit a new challenge to the device, where the new challenge is more complex than the previous challenge for which the invalid solution was received. In an example, the new and more complex challenge is expected to require more computation cycles to solve than solving the original challenge.

In another example, data may also be received unsolicited from a device by the gateway 212. For example, such data may not be accompanied by any solution and/or may not be in response to a transmission of any challenge to the device. The gateway 212 tags such data as possibly malicious, and appropriate operations are undertaken for the tagged malicious data. In one example, the gateway 212 discards the tagged data. In another example, the gateway routes the tagged data to a next destination (e.g., to a logging service, in case the malicious tagged data is to be logged for later analysis). In any case, handling of such tagged data accompanied by an invalid challenge solution is different from handling of legitimate data accompanied by a valid challenge solution. In an example, if such unsolicited data is received, the gateway determines an IP address of the sending device, and blocks any challenge requests from the IP address from at least a threshold period of time. In an example, the threshold period of time may be adaptively made longer, e.g., if multiple instances of unsolicited data are received from the IP address of the device. Additionally, or alternatively, the gateway may transmit a new challenge to the device, where the new challenge is highly complex.

Referring again to the method 400 of FIG. 4, if "Yes" at 424, the solution is valid, and the method 400 proceeds from 424 to 432. At 432, the gateway reroutes the data to downstream services (such as the logging and processing services 216), for storing and/or processing the data.

Subsequent to 432, the method 400 loops back to 404, where the gateway waits for another challenge request. In an example, for various iterations of the method 400, the device may be same or different. Thus, the method 400 is executed for challenge/solution communication with a plurality of devices, such as a plurality of mobile devices including the assurance service 238 transmitting telemetry data to the cloud provider tenancy 208, and/or possibly one or more malicious devices attempting to transmit malicious data to the cloud provider tenancy 208.

FIG. 5 is another flow diagram depicting another method 500 for challenge/solution communication between a gateway of a cloud provider tenancy and a device, for transmission of data from the device to the gateway, where the challenge/solution communication involves the gateway posing a proof-of-work challenge to the device, and where the same challenge can be used for a number of times "N" and/or for a time period "T," where N is a positive integer that is at least one, and T is a time duration that is greater than zero (e.g., that is at least an amount of time in which the client is expected to provide a solution to a challenge).

Similar to the method 400, the gateway of the method 500 may be any of the gateways described above, such as the gateway 112 or 212. The device of the method 500 may be any of the devices described above, such as the client 104, the mobile device 204, or the device 276. Thus, in one example, the device of the method 400 may be a legitimate device that includes the assurance service 238, where the assurance service 238 transmits legitimate telemetry data to the gateway 212. In another example, the device of the method 500 may be a malicious device transmits malicious telemetry data to the gateway 212.

At 504 of the method 500, the gateway receives, from a device, a challenge request; and transmits, to the device, a challenge. Note that the challenge may be generated using techniques described above with respect to process 408 of method 400 of FIG. 4. Description of one or more processes of the method 400 of FIG. 4 may also be applicable to corresponding one or more processes of the method 500 of FIG. 5.

In an example, the challenge transmitted at 504 includes, or is accompanied by, (i) a server timestamp (e.g., server timestamp 313 of FIG. 3), (ii) a number of times "N" of data transmission, for which the challenge is alive and valid, and/or (iii) a time period "T" for which the challenge is alive and valid. As described above, N is a positive integer that is at least one, and the challenge is valid for transmitting data at least once. Also, T is a time duration that is greater than zero (e.g., that is at least an amount of time in which the client is expected to provide a solution to a challenge).

Also at 504, a counter (such as the above-described server-side counter) is set to N. The counter tracks a number of times a solution to the same challenge can be used for transmission of data from the device (such as from the IP address of the device) to the gateway. The counter is set to N at 504, as N is the number of times of data transmission for which the challenge is alive and valid. In an example, the counter is maintained by the gateway 212, such as by the challenge service 250. In an example, the counter is maintained within a data repository within the cloud provider tenancy 208 (or stored in another location accessible to the gateway 212).

The method 500 proceeds from 504 to 508. At 508, the gateway (i) receives, from the device, a solution to the challenge, accompanied by first data; (ii) verifies that the solution to the challenge is valid; and (iii) reroutes the first data to downstream services (such as logging and processing services 216), for storing and/or processing of the first data. These operations have also been described above with respect to the method 400 of FIG. 4.

Also at 508, the counter is decremented by 1 (e.g., counter=counter−1). Because the challenge is used once for receiving the first data, the counter is correspondingly decremented by one.

The method 500 proceeds from 508 to 512. At 512, the gateway receives additional data from the device. In an example, the additional data is not received in response to a fresh challenge. Thus, the device has not solved a new or fresh challenge, prior to sending the addition data. In an example, the device transmits the additional data to the gateway, without any accompanying solution to any challenge. In another example, the device transmits the data to the gateway, along with the previously solved solution and/or the identifier of the challenge solved previously by the device.

The method 500 proceeds from 512 to 516. At 516, the gateway checks whether both the following conditions are satisfied: (i) whether the counter is greater than zero (counter >0?) and (ii) whether the current time is within the time period T from the server timestamp. In an example, both conditions have to be satisfied for the challenge to be alive and valid.

If "No" at 516 (e.g., if one or both the conditions of 516 are not satisfied), this implies that the challenge is not alive. Accordingly, the method 500 proceeds from 516 to 520. At 520, the gateway informs the device that the challenge is no longer alive, and cannot be reused to send the additional data. Additionally (or alternatively), the gateway tags the additional data as possibly malicious, undertakes appropriate operations for the tagged malicious data (e.g., as described above with respect to process 428 of the method 400).

The method 500 loops back from 520 to 504, where a new challenge request may be received from the device. Because the device knows that the challenge is no longer alive, the device may not send any further additional data based on the same challenge solution. Hence, the method loops back from 520 to 504. However, if the device is malicious (or is simply ignorant of the protocol for sending data to the gateway), the device may reattempt to transmit further additional data to the gateway, in which case the method 500 may loop back from 520 to 512 (illustrated as a dotted line from 520 to 512).

On the other hand, if "Yes" at 516 (e.g., if both the conditions of 516 are satisfied), this implies that the challenge is still alive. Accordingly, the method 500 proceeds from 516 to 524. At 524, the gateway reroutes the additional data to downstream services (e.g., the logging and processing services 216), for storing and/or processing the additional data (e.g., as described with respect to process 432 of method 400 of FIG. 4). Also at 524, the counter is decremented by one (e.g., counter=counter−1). Because the same challenge is used once again for receiving the additional data, the counter is correspondingly decremented by one.

The method 500 loops back from 524 to either 504 (shown using a dashed line) or to 512 (shown using a solid line), e.g., depending on subsequent actions taken by the device. For example, if the counter has reached zero and/or if the current time is more than the time period T from the server timestamp, the challenge is dead or invalid. Accordingly, the challenge solution of processes 504 and 508 may no longer be used to transmit further additional data. In such a situation, a device (such as the assurance service 238 within the mobile device 204) may not use the same challenge solution, and transmits a new challenge request when the device wants to transmit further additional data, in which case the method loops back from 524 to 504.

In another example, if the counter has not yet reached zero and if the current time is within the time period T from the server timestamp, the challenge is still alive and valid for sending further additional data. Accordingly, the device may use the same challenge solution to transmit further additional data, in which case the method loops back from 524 to 512.

Computer System Architecture

FIG. 6 depicts a simplified diagram of a distributed system 600 for implementing an embodiment. In the illustrated embodiment, distributed system 600 includes one or more client computing devices 602, 604, 606, 608, and/or 610 coupled to a server 614 via one or more communication networks 612. Clients computing devices 602, 604, 606, 608, and/or 610 may be configured to execute one or more applications.

In various aspects, server 614 may be adapted to run one or more services or software applications that enable techniques for receiving, by a gateway, data from various devices, including telemetry data from assurance services in mobile applications deployed within various mobile devices. To avoid or at least reduce possibility of DDoS attacks and/or possibility of transmission of a large volume of fake and malicious data, a challenge/solution framework is employed, when receiving data from the devices.

In certain aspects, server 614 may also provide other services or software applications that can include non-virtual and virtual environments. In some aspects, these services may be offered as web-based or cloud services, such as under a Software as a Service (SaaS) model to the users of client computing devices 602, 604, 606, 608, and/or 610. Users operating client computing devices 602, 604, 606, 608, and/or 610 may in turn utilize one or more client applications to interact with server 614 to utilize the services provided by these components.

In the configuration depicted in FIG. 6, server 614 may include one or more components 620, 622 and 624 that implement the functions performed by server 614. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, 608, and/or 610 for techniques for executing mobile applications including assurance services, receiving challenges, solving the challenges, and transmitting data along with the solution to a gateway, in accordance with the teachings of this disclosure. A client device may provide an interface that enables a user of the client device to interact with the client device. The client device may also output information to the user via this interface. Although FIG. 6 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 612 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 612 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 614 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 614 can include one or more virtual machines running virtual operating systems, or other computing architectures involving virtualization such as one or more flexible pools of logical storage devices that can be virtualized to maintain virtual storage devices for the server. In various aspects, server 614 may be adapted to run one or more services or software applications that provide the functionality described in the foregoing disclosure.

The computing systems in server 614 may run one or more operating systems including any of those discussed above, as well as any commercially available server operating system. Server 614 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 614 may include one or more applications to analyze and consolidate data feeds and/or event updates received from users of client computing devices 602, 604, 606, 608, and/or 610. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 614 may also include one or more applications to display the data feeds and/or real-time events via one or more display devices of client computing devices 602, 604, 606, 608, and/or 610.

Distributed system 600 may also include one or more data repositories 616, 618. These data repositories may be used to store data and other information in certain aspects. For example, one or more of the data repositories 616, 618 may be used to store information, such as challenge related information (e.g., challenge identifiers, seed identifiers, tokens, solution to the challenges, etc.), counters described with respect to the method 500 of FIG. 5, and/or the like. Data repositories 616, 618 may reside in a variety of locations. For example, a data repository used by server 614 may be local to server 614 or may be remote from server 614 and in communication with server 614 via a network-based or dedicated connection. Data repositories 616, 618 may be of different types. In certain aspects, a data repository used by server 614 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 616, 618 may also be used by applications to store application data. The data repositories used by applications may be of different types such as, for example, a key-value store repository, an object store repository, or a general storage repository supported by a file system.

In one embodiment, server 614 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

FIG. 7 is a simplified block diagram of a cloud-based system environment in which techniques are employed for receiving, by a gateway, data from various devices, including telemetry data from assurance services in mobile applications deployed within various mobile devices. To avoid or at least reduce possibility of DDoS attacks, a challenge/solution framework is employed, when receiving data from the devices. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other aspects, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative aspects.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 710 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 702 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 702 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 702. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 702. Cloud infrastructure system 702 then performs processing to provide the services requested in the tenant's subscription order. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public tenant, where the tenant can be an individual or an enterprise. In certain other aspects, under a private cloud model, cloud infrastructure system 702 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702.

In some aspects, the processing performed by cloud infrastructure system 702 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining the intent of an utterance. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain aspects, to facilitate efficient provisioning of these resources for supporting the various cloud services provided by cloud infrastructure system 702 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a tenant may, using a client device, request (service request 734) one or more services provided by cloud infrastructure system 702 using one or more of interfaces 714, 716, and 718. For example, a tenant may access the online store, browse cloud services offered by cloud infrastructure system 702, and place a subscription order for one or more services offered by cloud infrastructure system 702 that the tenant wishes to subscribe to. The service request may include information identifying the tenant and one or more services that the tenant desires to subscribe to.

In certain aspects, such as the embodiment depicted in FIG. 7, cloud infrastructure system 702 may comprise an order management subsystem (OMS) 720 that is configured to process the new order. As part of this processing, OMS 720 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 702 may send a response or notification 744 to the requesting tenant to indicate when the requested service is now ready for use. In some instances, information (e.g., a link) may be sent to the tenant that enables the tenant to start using and availing the benefits of the requested services.

Cloud infrastructure system 702 may provide services to multiple tenants. For each tenant, cloud infrastructure system 702 is responsible for managing information related to one or more subscription orders received from the tenant, maintaining tenant data related to the orders, and providing the requested services to the tenant or clients of the tenant. Cloud infrastructure system 702 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 702 may provide services to multiple tenants in parallel. Cloud infrastructure system 702 may store information for these tenants, including possibly proprietary information. In certain aspects, cloud infrastructure system 702 comprises an identity management subsystem (IMS) 728 that is configured to manage tenant's information and provide the separation of the managed information such that information related to one tenant is not accessible by another tenant. IMS 728 may be configured to provide various security-related services such as identity services, such as information access management, authentication and authorization services, services for managing tenant identities and roles and related capabilities, and the like.

FIG. 8 illustrates an exemplary computer system 800 that may be used to implement certain aspects. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative aspects of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some aspects, processing subsystem 804 can include one or more special purpose co-processors such as graphics processors, digital signal processors (DSPs), or the like. In some aspects, some or all of the processing units of processing subsystem 804 can be implemented using customized circuits, such as application specific integrated circuits (ASICs), or field programmable gate arrays (FPGAs).

In some aspects, the processing units in processing subsystem 804 can execute instructions stored in system memory 810 or on computer readable storage media 822. In various aspects, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain aspects, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some aspects. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 822 may store programming and data constructs that provide the functionality of some aspects. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, digital video disc (DVD), a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 818 may also include a computer-readable storage media reader 820 that can further be connected to computer-readable storage media 822. Reader 820 may receive and be configured to read data from a memory device such as a disk, a flash drive, etc.

In certain aspects, computer system 800 may support virtualization technologies, including but not limited to virtualization of processing and memory resources. For example, computer system 800 may provide support for executing one or more virtual machines. In certain aspects, computer system 800 may execute a program such as a hypervisor that facilitates the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain aspects, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 824 can provide wired network connectivity (e.g., Ethernet) in addition to or instead of a wireless interface.

Communication subsystem 824 can receive and transmit data in various forms. For example, in some aspects, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method comprising:
receiving, from a device, a challenge request;
transmitting, to the device, a challenge, responsive at least in part to the challenge request, wherein the challenge is a proof-of-work challenge;
receiving, from the device, a solution to the challenge, wherein the solution to the challenge accompanies data;
verifying a validity of the solution to the challenge; and
performing one or both of storing and processing the data, responsive at least in part to the solution being valid for the challenge, wherein the solution to the challenge is valid for one or both of storing or processing additional data from the device for at least a threshold number of times, without the additional data being accompanied by any additional solution to any additional challenge.

2. The method of claim 1, wherein the solution to the challenge is derived by the device.

3. The method of claim 1, wherein the challenge is set such that the solution to the challenge is to be derived by the device, without any intervention by a user of the device and without the user of the device providing the solution.

4. The method of claim 1, wherein a derivation of the solution to the challenge is transparent to a user of the device.

5. The method of claim 1, wherein:
the challenge request and the solution to the challenge are received from a library that is packaged with a mobile application being executed within the device; and
the data is generated based on the library monitoring an operation of the mobile application.

6. The method of claim 1, wherein:
the solution accompanying the data is received by a gateway; and
performing one or both of storing and processing the data is not dependent on authentication or identification of the device by the gateway.

7. The method of claim 1, wherein the challenge request is a first challenge request, the device is a first device, the challenge is a first challenge, the solution is a first solution, and wherein the method further comprises:
receiving, from a second device, a second challenge request;
transmitting, to the second device, a second challenge, responsive at least in part to the second challenge request;
receiving, from the second device, a second solution to the second challenge, wherein the second solution to the second challenge accompanies additional data;
verifying that the second solution to the second challenge is invalid; and refraining from storing or processing the additional data, responsive at least in part to verifying that the second solution to the second challenge is invalid.

8. The method of claim 7, further comprising:

responsive at least in part to verifying that the second solution to the second challenge is invalid, performing at least one of:

(i) determining an Internet Protocol (IP) address of the second device, and blocking additional challenge requests from the IP address for at least a threshold period of time; or (ii) transmitting, to the second device, a third challenge, wherein the third challenge is more complex than the second challenge and is expected to require more computation cycles to solve than solving the second challenge.

9. The method of claim 1, wherein the device is a first device, and wherein the method further comprises:

receiving, from a second device, additional data that is not accompanied by any solution or that is not in response to a transmission of any challenge to the second device; and refraining from storing or processing the additional data, responsive at least in part to the additional data not being accompanied by any solution or not being in response to the transmission of any challenge to the second device.

10. The method of claim 1, further comprising:

determining an Internet Protocol (IP) address of the device;

selecting a level of complexity for the challenge, based at least in part on an observed pattern of prior data transmission received from the IP address; and generating the challenge with the selected level of complexity, wherein the generated challenge is transmitted to the device.

11. The method of claim 10, wherein selecting the level of complexity for the challenge comprises:

prior to receiving the challenge request, receiving higher than a threshold number of additional challenge requests from the IP address of the device within a threshold time duration; and selecting a higher level of complexity for the challenge that is higher than a lower level of complexity, responsive at least in part to receiving higher than the threshold number of additional challenge requests within the threshold time duration, wherein a number of computation cycles to solve the challenge with the higher level of complexity is expected to be higher than a number of computation cycles to solve the challenge with the lower level of complexity.

12. The method of claim 10, wherein:

the challenge involves a requested leading number of zeros, wherein the solution comprises a header, which when processed using a pre-agreed algorithm, results in the requested leading number of zeros; and selecting the level of complexity for the challenge comprises increasing the requested leading number of zeros to correspondingly increase the level of complexity for the challenge.

13. The method of claim 1, wherein the challenge request is a first challenge request, the challenge is a first challenge, and wherein the method further comprises:

subsequent to receiving the solution to the challenge, receiving, from the device, a second challenge request, wherein the second challenge request is received within a threshold time duration from receiving the first challenge request;

generating a second challenge, wherein a level of complexity of the second challenge is higher than a level of complexity of the first challenge, responsive at least in part to receiving the second challenge request within the threshold time duration from receiving the first challenge request; and transmitting, to the device, the second challenge.

14. The method of claim 1, further comprising:

generating a first token by hashing an Internet Protocol (IP) address of the device with a seed;

generating the challenge that includes a requested number of leading zeros, wherein the generated challenge is transmitted to the device and is accompanied by one or more of (i) a first identifier of the challenge, (ii) the first token, and (iii) a timestamp associated with generating the challenge; and reading the solution to the challenge, wherein the solution includes a header, and wherein reading the solution comprises identifying, within the header, one or more of (i) a second identifier of the challenge, (ii) a second token, or (iii) a string of numbers generated by the device.

15. The method of claim 14, wherein verifying the validity of the solution to the challenge comprises one or more of:

verifying that the second token is a hash of the IP address of the device and the seed;

verifying that the second identifier of the challenge matches the first identifier of the challenge; or encrypting the header using a pre-agreed algorithm to generate an encrypted header, and verifying that the encrypted header has the requested number of leading zeros.

16. The method of claim 1, further comprising:

generating a timestamp indicative of a time of generation of the challenge or transmission of the challenge to the device;

wherein verifying the validity of the solution to the challenge comprises:

verifying whether (i) the solution is correct for the challenge, and (ii) the solution is received with a threshold time duration from the timestamp.

17. The method of claim 1, further comprising:

transmitting a response to the device, subsequent to storing or processing the data, wherein the response indicates one or more of (i) the solution is valid, and (ii) data is stored, and will be or has been processed.

18. The method of claim 1, wherein the data is first data, and the method further comprises:

subsequent to verifying the validity of the solution to the challenge, setting a counter indicative of the threshold number of times;

decrementing the counter by one, responsive at least in part to storing or processing the data;

receiving, from the device, second data of the additional data, the second data not accompanied by any additional solution to any additional challenge;

subsequent to receiving the second data, verifying that the counter is greater than zero;

at least one of storing or processing the second data, responsive at least in part to verifying that the counter is greater than zero; and subsequent to the at least one of storing or processing the second data, decrementing the counter by one.

19. The method of claim 1, wherein the solution to the challenge is valid for one or both of storing and processing additional data from the device for at least a threshold period of time, and wherein the method comprises:

receiving second data, and verifying that a time at which the second data is received is within the threshold period of time from a timestamp associated with the challenge, wherein the at least one of storing or processing the second data is further responsive at least in part to verifying that the current time is within the threshold period of time from the timestamp.

20. A method comprising:

transmitting, from a client to a gateway, a challenge request;

receiving a proof-of-work challenge, responsive at least in part to the challenge request;

solving the challenge to generate a solution;

identifying data to be sent to a server through the gateway;

transmitting the solution, along with the data, to the server through the gateway; and transmitting additional data to the server through the gateway for at least a threshold number of times, without the additional data being accompanied by any additional solution to any additional challenge.

21. The method of claim 20, wherein the server is within a cloud provider tenancy of a cloud environment, and wherein the client is a mobile application that is configured to transmit application data of a mobile application to a customer tenancy of the cloud environment, the customer tenancy being different from the cloud provider tenancy.

22. A non-transitory computer-readable medium including instructions that when executed by one or more processors, cause the one or more processors to perform operations including:

receiving, from a device, a challenge request;

transmitting, to the device, a challenge, responsive at least in part to the challenge request, wherein the challenge is a proof-of-work challenge;

receiving, from the device, a solution to the challenge, wherein the solution to the challenge accompanies data;

verifying a validity of the solution to the challenge; and at least one of storing or processing the data, responsive at least in part to the solution being valid for the challenge, wherein the solution to the challenge is valid for one or both of storing or processing additional data from the device for at least a threshold period of time, without the additional data being accompanied by any additional solution to any additional challenge.

23. A system comprising:

one or more processors; and one or more non-transitory computer-readable media storing instructions, which, when executed by the system, cause the system to perform a set of actions including:

receiving, from a device, a challenge request;

transmitting, to the device, a challenge, responsive at least in part to the challenge request, wherein the challenge is a proof-of-work challenge;

receiving, from the device, a solution to the challenge, wherein the solution to the challenge accompanies data;

verifying a validity of the solution to the challenge; and performing one or both of storing and processing the data, responsive at least in part to the solution being valid for the challenge, wherein the solution to the challenge is valid for one or both of storing or processing additional data from the device for at least a threshold period of time, without the additional data being accompanied by any additional solution to any additional challenge.

24. A method comprising:

receiving, from a device, a challenge request;

determining an Internet Protocol (IP) address of the device;

determining that prior to receiving the challenge request, higher than a threshold number of additional challenge requests were received from the IP address of the device within a threshold time duration;

selecting a higher level of challenge complexity that is higher than a lower level of challenge complexity, responsive at least in part on determining that higher than the threshold number of additional challenge requests were received from the IP address of the device within the threshold time duration;

transmitting, to the device, a challenge that has the higher level of challenge complexity, responsive at least in part to the challenge request, wherein the challenge is a proof-of-work challenge;

receiving, from the device, a solution to the challenge, wherein the solution to the challenge accompanies data;

verifying a validity of the solution to the challenge; and performing one or both of storing and processing the data, responsive at least in part to the solution being valid for the challenge.

* * * * *